US010685286B1

(12) United States Patent
McDonnell et al.

(10) Patent No.: US 10,685,286 B1
(45) Date of Patent: Jun. 16, 2020

(54) AUTOMATED NEURAL NETWORK GENERATION USING FITNESS ESTIMATION

(71) Applicant: SparkCognition, Inc., Austin, TX (US)

(72) Inventors: Tyler S. McDonnell, Austin, TX (US); Bryson Greenwood, Austin, TX (US)

(73) Assignee: SPARKCOGNITION, INC., Austin, TX (US)

( * ) Notice: Subject to any disclaimer, the term of this patent is extended or adjusted under 35 U.S.C. 154(b) by 0 days.

(21) Appl. No.: 16/526,360

(22) Filed: Jul. 30, 2019

(51) Int. Cl.
*G06N 3/08* (2006.01)
*G06N 3/04* (2006.01)

(52) U.S. Cl.
CPC .............. *G06N 3/086* (2013.01); *G06N 3/04* (2013.01); *G06N 3/0445* (2013.01)

(58) Field of Classification Search
None
See application file for complete search history.

(56) References Cited

U.S. PATENT DOCUMENTS

| 5,249,259 | A | * | 9/1993 | Harvey | .................. | G06N 3/126 |
| | | | | | | 706/13 |
| 5,636,326 | A | | 6/1997 | Stork et al. | | |
| 5,835,901 | A | | 11/1998 | Duvoisin, III et al. | | |
| 6,128,609 | A | | 10/2000 | Rose | | |
| 7,092,857 | B1 | | 8/2006 | Steiner | | |
| 7,293,002 | B2 | | 11/2007 | Starzyk | | |
| 7,324,979 | B2 | | 1/2008 | Butler et al. | | |
| 8,762,299 | B1 | | 6/2014 | Breckenridge et al. | | |
| 9,449,271 | B2 | | 9/2016 | Wang et al. | | |
| 9,559,918 | B2 | | 1/2017 | Di Pietro et al. | | |

(Continued)

FOREIGN PATENT DOCUMENTS

| WO | WO-2018156942 A1 | * | 8/2018 | ............. G06N 3/086 |
| WO | WO-2019101836 A1 | * | 5/2019 | ............. G06N 3/086 |
| WO | WO-2019152929 A1 | * | 8/2019 | ............. G06N 3/086 |

OTHER PUBLICATIONS

Hochreiter, Sepp, and Jürgen Schmidhuber. "Long short-term memory." Neural computation 9, No. 8 (1997): 1735-1780. (Year: 1997).*
Assuncao, F., et al., "DENSER: Deep Evolutionary Network Structured Representation", Genetic Programming and Evolvable Machines 2018, 11 pages.
Pham, H., et al., "Efficient Neural Architecture Search via Parameter Sharing", Proceeding of the 35th International Conference on Machine Learning, PMLR 80:4095-4104, 2018, 11 pages.

(Continued)

*Primary Examiner* — Alexey Shmatov
*Assistant Examiner* — Casey R. Garner
(74) *Attorney, Agent, or Firm* — Moore IP Law

(57) ABSTRACT

A method of generating a neural network includes iteratively performing operations including generating, for each neural network of a population, a matrix representation. The matrix representation of a particular neural network includes rows of values, where each row corresponds to a set of layers of the particular neural network and each value specifies a hyperparameter of the set of layers. The operations also include providing the matrix representations as input to a relative fitness estimator that is trained to generate estimated fitness data for neural networks of the population. The estimated fitness data are based on expected fitness of neural networks predicted by the relative fitness estimator. The operations further include generating, based on the estimated fitness data, a subsequent population of neural networks. The method also includes, when a termination condition is satisfied, outputting data identifying a neural network as a candidate neural network.

30 Claims, 6 Drawing Sheets

(56) References Cited

U.S. PATENT DOCUMENTS

| | | | |
|---|---|---|---|
| 9,852,019 B2 | 12/2017 | Ashani | |
| 2002/0138457 A1* | 9/2002 | Jin | G06N 3/126 706/26 |
| 2004/0204930 A1 | 10/2004 | Chang et al. | |
| 2007/0094168 A1 | 4/2007 | Ayala et al. | |
| 2007/0097959 A1 | 5/2007 | Taylor | |
| 2007/0288410 A1* | 12/2007 | Tomkins | G06N 3/086 706/42 |
| 2015/0106310 A1* | 4/2015 | Birdwell | G06F 16/22 706/20 |
| 2015/0324690 A1 | 11/2015 | Chilimbi et al. | |
| 2016/0155069 A1 | 6/2016 | Hoover et al. | |
| 2016/0364810 A1 | 12/2016 | Yang et al. | |
| 2017/0236337 A1 | 8/2017 | Devries | |
| 2017/0308557 A1 | 10/2017 | Cassidy et al. | |
| 2018/0114115 A1* | 4/2018 | Liang | G06N 3/0454 |
| 2019/0122096 A1* | 4/2019 | Husain | G06N 3/04 |
| 2019/0122119 A1* | 4/2019 | Husain | G06N 3/086 |
| 2019/0180186 A1* | 6/2019 | Liang | G06N 3/086 |

OTHER PUBLICATIONS

Liu, H., et al., "DARTS: Differentiable Architecture Search", ICLR 2019, 13 pages.

Liu, C., et al., Progressive Neural Architecture Search, European Conference on Computer Vision, Computer Vision—ECCV 2018, 20 pages.

Stanley, K., et al., "Evolving Neural Networks through Augmenting Topologies", Evolutionary Computation 10(2): 99-127, Massachusetts Institute of Technology, 2002, 30 pages.

Gaier, A., et al, Data-efficient Neuroevolution with Kernel-Based Surrogate Models, GECCO, Jul. 15-19, 2018, Kyoto, Japan, 8 pages.

Zoph, B., et al., "Neural Architecture Search with Reinforcement Learning", ICLR, 2017, pp. 1-16.

Denoeux, T., "A Neural Network Classifier Based on Dempster-Shafer Theory," IEEE Transactions on Systems, Man, and Cybernetics—Part A: Systems and Humans, vol. 30, No. 2, IEEE, Piscataway, NJ, Mar. 2000, pp. 131-150.

Floreano, D., et al., "Neuroevolution: from architectures to learning," Review Article, 2008, Evol. Intel., vol. 1, Springer-Verlag, pp. 47-62.

\* cited by examiner

AUTOMATED NEURAL NETWORK GENERATION USING FITNESS ESTIMATION

BACKGROUND

Advances in machine learning have enabled computing devices to solve complex problems in many fields. For example, image analysis (e.g., face recognition), natural language processing, and many other fields have benefitted from the use of machine learning techniques. For certain types of problems, advanced computing techniques, such as genetic algorithms, can be used to generate a machine learning model, such as a neural network. In one example, a genetic algorithm applies neuroevolutionary techniques over multiple epochs to evolve candidate neural networks to model a training data set.

Neural networks generally do not describe a human-understandable relationship between input data and output data. Stated another way, it is generally not clear, from a human perspective, whether or why a specific neural network would be expected to produce a reliable result. Accordingly, it can be challenging to determine whether a particular candidate neural network that is produced by the genetic algorithm is likely or unlikely to be accurate or reliable. The accuracy and/or reliability of a neural network can be summarized using a fitness value, which indicates how closely output of the neural network matches an expected output determined based on the training data set. However, determining a fitness value for each neural network during each epoch of a neuroevolutionary process is time consuming and uses significant processing resources.

SUMMARY

In a particular aspect, a method of generating a neural network based on a data set includes iteratively performing a set of operations until a termination condition is satisfied. The operations include generating, for each neural network of a population of neural networks, a matrix representation. The matrix representation of a particular neural network includes two or more rows of values, where each row corresponds to a set of layers of the particular neural network and each value specifies a hyperparameter of the set of layers. The operations also include providing the matrix representations as input to a relative fitness estimator that is trained to generate estimated fitness data for neural networks of the population. The estimated fitness data are based on expected fitness of neural networks predicted by the relative fitness estimator. The operations further include generating, based on the population and based on the estimated fitness data, a subsequent population of neural networks. The method also includes, based on a determination that the termination condition is satisfied, outputting data identifying one or more neural networks of a final population of neural networks as a candidate neural network based on the data set.

In another particular aspect, a computing device includes a processor and a memory storing instructions that are executable by the processor to cause the processor to iteratively perform a set of operations until a termination condition is satisfied. The operations include generating, for each neural network of a population of neural networks, a matrix representation. The matrix representation of a particular neural network includes two or more rows of values, where each row corresponds to a set of layers of the particular neural network and each value specifies a hyperparameter of the set of layers. The operations also include providing the matrix representations as input to a relative fitness estimator that is trained to generate estimated fitness data for neural networks of the population. The estimated fitness data are based on expected fitness of neural networks predicted by the relative fitness estimator. The operations further include generating, based on the population and based on the estimated fitness data, a subsequent population of neural networks. The instructions are further executable by the processor to cause the processor to, based on a determination that the termination condition is satisfied, output data identifying one or more neural networks of a final population of neural networks as a candidate neural network.

In another particular aspect, a computer-readable storage device stores instructions that, when executed by a processor, cause the processor to iteratively perform a set of operations until a termination condition is satisfied. The operations include generating, for each neural network of a population of neural networks, a matrix representation. The matrix representation of a particular neural network includes two or more rows of values, where each row corresponds to a set of layers of the particular neural network and each value specifies a hyperparameter of the set of layers. The operations also include providing the matrix representations as input to a relative fitness estimator that is trained to generate estimated fitness data for neural networks of the population. The estimated fitness data are based on expected fitness of neural networks predicted by the relative fitness estimator. The operations further include generating, based on the population and based on the estimated fitness data, a subsequent population of neural networks. The instructions are further executable by the processor to cause the processor to, based on a determination that the termination condition is satisfied, output data identifying one or more neural networks of a final population of neural networks as a candidate neural network.

DETAILED DESCRIPTION

Figure 1:
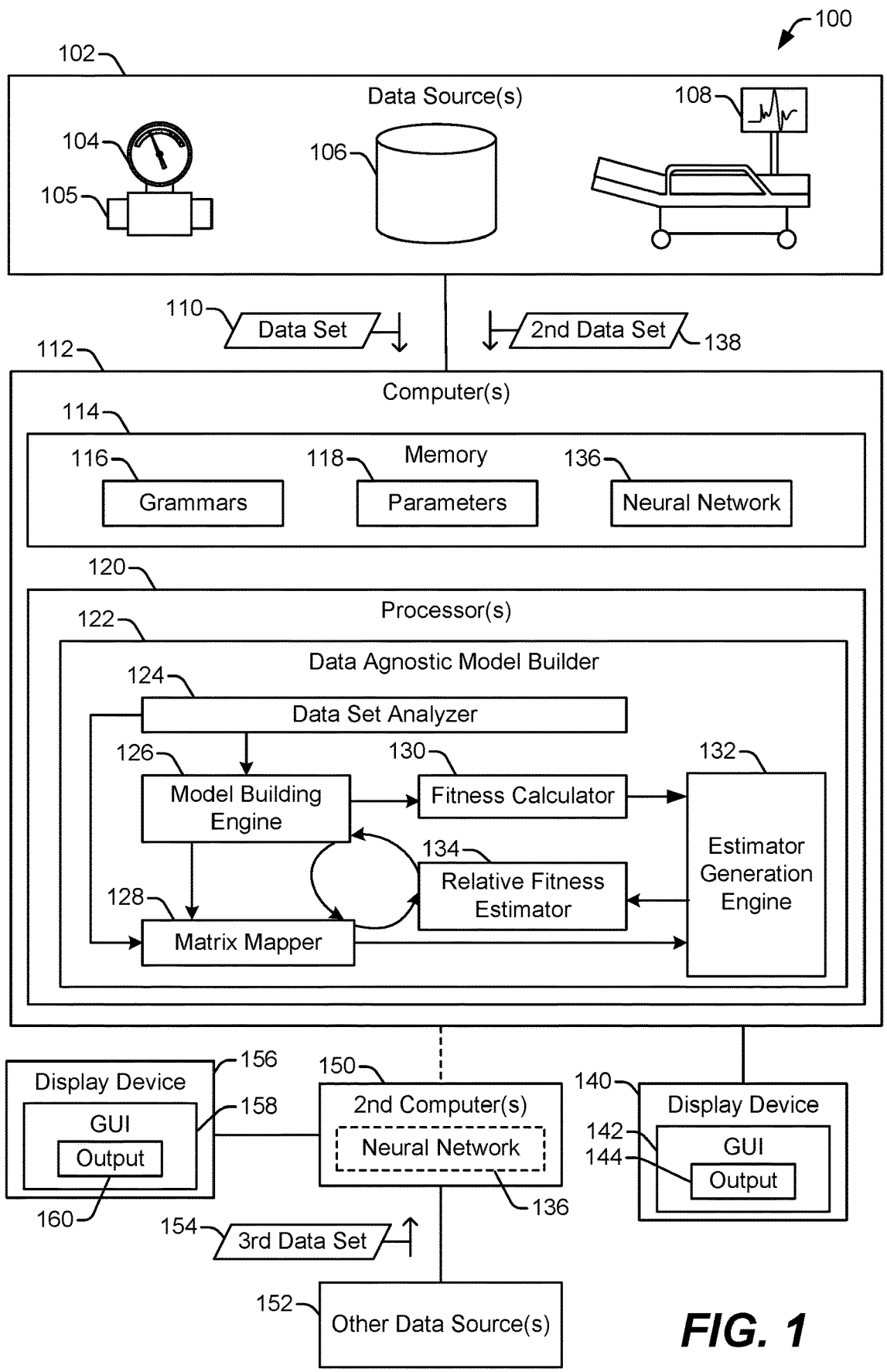
FIG. 1 illustrates a system that includes a data agnostic model builder to model data from a variety of data sources.

The present disclosure provides systems and methods to automatically generate a neural network based on a specified data set. A data-agnostic neuroevolutionary process is used to automate model building for the data set. The neuroevolutionary process uses operations modeled after natural evolutionary processes to generate the neural network, and many of the terms used to describe the neuroevolutionary process are derived from their counterparts in biological evolution. For example, the neuroevolutionary process starts with a set of neural networks referred to as a "population" of neural networks or simply a "population". "Evolutionary processes" are performed on the members of a population in one epoch to generate a population for a subsequent epoch. The evolutionary processes performed include, for example, "mutation", which involves changing one or more features of a neural network (or a set of neural networks referred to as a genus); "cross-over", which involves combining features of two or more neural networks (e.g., "parent" neural networks) to form a new neural network (e.g., a "child" neural network); and "extinction", which involves dropping one or more neural networks from the population.

A fitness evaluation can be used (alone or in combination with a randomization process) to determine which neural networks of a population are to participate in an evolutionary process, which evolutionary process is used to modify a neural network, to what extent the neural network is modified, and/or other features of the evolutionary processes. "Fitness" in this context is an indication of how well a particular neural network performs its intended function. Fitness is evaluated (or calculated) by providing test data as input to the neural network and comparing an output of the neural network to an expected result. For a particular input data sample, the difference between the output of the neural network and the expected result is an error value. The fitness of the neural network is generally based on error values for multiple input data samples. Thus, calculating the fitness of one neural network in a population involves providing multiple input data samples to the neural network to determine multiple error values, and then calculating the fitness as a statistical value representative of the multiple error values. Each population of neural networks can include on the order of hundreds or thousands of neural networks. Accordingly, calculating the fitness of every neural network of a population during every epoch uses substantial computing resources (e.g., processor time, working memory, etc.).

Implementations disclosed herein significantly reduce the amount of computing resources used to generate a neural network using a neuroevolutionary process by using a relative fitness estimator that is trained (using a machine learning process) to estimate the relative fitness of the neural networks of a population. In a particular implementation, the relative fitness estimator takes data representing a neural network as input and generates an estimated relative fitness value as output (without calculating error values for multiple input data samples). The estimated relative fitness value of one neural network can be compared to the estimated relative fitness values of another neural network of the population to make decisions about evolutionary processes to be performed using either or both of the neural networks. In some implementations, the relative fitness estimator compares the estimated relative fitness values of two or more neural networks to generate ranking data for the neural networks of the population. In such implementations, the ranking data is used to make decisions about evolutionary processes to be performed.

In a particular implementation, the neuroevolutionary process intentionally introduces randomness in order to broaden the space of neural network features searched for a suitable neural network for a particular data set. This randomness presents a challenge to using a relative fitness estimator to estimate fitness values because the neural networks of a population have a variety of different structures and can differ in other ways as well. However, machine learning models, such as the relative fitness estimator, are generally configured to receive structured input via an input layer. Representing the various neural networks of a population to the input layer of the relative fitness estimator is challenging. Implementations disclosed herein use a grammar to generate a matrix representation for each neural network of the population. The matrix representation of a neural network includes a plurality of values arranged in a set of rows and a set of columns. Each row represents a set of one or more layers of the neural network, and each column represents a hyperparameter. The value corresponding to a particular row and a particular column encodes information about the hyperparameters of the one or more layer represented by the particular row. As an example, two or more columns of the matrix representation can correspond to structural characteristics of the one or more layers, and the values of the two or more columns can include binary or logical values indicating which of the structural characteristics is true of or present in the one or more layers. To illustrate, a particular column can have a value of one (1) indicating that the one or more layer have the structure characteristic corresponding to the particular column or can have a value of zero (0) indicating that the one or more layers do not have the structure characteristic corresponding to the particular column. The matrix representation can include one or more columns having values representing other hyperparameters, such a number of nodes in one or more layers, an activation function of one or more nodes, etc.

In some implementations, a master grammar is used to generate the matrix representations for the neuroevolutionary process. In this context, a "master grammar" refers to a grammar that enables representation of all possible combinations of features (e.g., all of the allowed features) that could be encountered during the neuroevolutionary process. In such implementations, the master grammar is independent of (e.g., agnostic with respect to) the data set used for the neuroevolutionary process.

In other implementations, the neuroevolutionary process can include a search space limiting process that limits neural network structures or other hyperparameters used by the neuroevolutionary process based on the data set used by the neuroevolutionary process. In such implementations, the grammar used to generate the matrix representations can be selected based on search space limitations applied to the neuroevolutionary process. The search space limitations are based on the data set to be modeled. For example, for time series data it is common to use neural networks with one or more recurrent layer structures, such as traditional recurrent neural network (RNN) layers, long short-term memory (LSTM) layers, gated recurrent units (GRU) layers, etc. In this example, if the data set to which the neuroevolutionary process is applied includes time series data, the neuroevolutionary process may be limited such that the neural networks generated can include one or more recurrent layer structures but omit certain other layer types, such as pooling layers. In this example, the matrix representation can include data indicting whether a particular layer is an RNN layer, an LSTM layer, a GRU layer, or fully connected, and can omit data related to other layer types, such as pooling layers. In contrast, if the data set includes images, the neuroevolutionary process may be limited such that recurrent layer structures are omitted, but pooling layers can be included.

The relative fitness estimator includes or corresponds to a trained machine learning model. In a particular implementation, the trained machine learning model is a neural network configured to process sequential data to generate a result, such as a 1D convolutional neural network (CNN) or a neural network having one or more recurrent layers, such as one or more LSTM layers, one or more RNN layers, or one or more GRU layers. In this implementation, the rows of a matrix representation of a particular neural network of a population can be provide as input to the relative fitness estimator row-by-row in a manner that retains or corresponds to the order of arrangement of the layers in the neural network. For example, if a particular neural network includes an input layer, three hidden layers, and an output layer, the three hidden layers can be encoded, via the grammar, to generate a matrix representation of the particular neural network. In this example, each row of the matrix representation corresponds to one hidden layer of the particular neural network. The matrix representation can be provide as input to the relative fitness estimator by providing the first row (e.g., the row representing the first hidden layer) to the relative fitness estimator, then providing the second row (e.g., the row representing the second hidden layer) to the relative fitness estimator, and then providing the third row (e.g., the row representing the third hidden layer) to the relative fitness estimator. As a result of the 1D CNN or recurrent layer structure of the relative fitness estimator, the output generated by the relative fitness estimator is based on the values of each of the rows as well as interrelations of the layers as indicated by the order of the rows. In other implementations, the relative fitness estimator includes a machine learning model that is not configured to process sequential data to generate a result, such as a random forest or a feed-forward neural network). In such implementations, the relative fitness estimator also includes a flattening process to pre-process data representing multiple rows of the matrix representation to generate a single input vector for the machine learning model.

In a particular implementation, the relative fitness estimator is trained during or as part of the neuroevolutionary process. For example, after the neuroevolutionary process generates a population of neural networks, a fitness value can be calculated for each of the neural networks (e.g., using traditional fitness calculations as described above). The fitness value for a particular neural network can be used along with the matrix representation of the particular neural network as training data to train the relative fitness estimator. Using this training data, the relative fitness estimator is trained to predict a fitness value of a neural network based on a matrix representation of the neural network.

After the relative fitness estimator is trained, the relative fitness estimator can be used (rather than using traditional fitness calculations) to estimate relative fitness values for neural networks in subsequent epochs. Additionally, in some implementations, a subset of the neural networks of one or more of the subsequent epochs can be used to generate updated training data to update or refine the relative fitness estimator. As explained above, when each population includes a large number of neural networks, calculating the fitness value of each of the neural networks uses significant computing resources. Accordingly, training the relative fitness estimator to estimate the fitness of the neural networks can greatly reduce the computing resources used in subsequent epochs (e.g., after the relative fitness estimator is trained).

The operations performed by the neuroevolutionary process during an epoch are based on the estimated relative fitness of the members of the population of neural networks of the epoch. For example, the relative fitness estimator can be used to evaluate candidate neural networks during each epoch. Each epoch includes a particular number of candidate neural networks produced via various evolutionary operations (e.g., crossover and mutation operations) that are performed on the candidate neural networks of a preceding epoch. The way that the evolutionary operations modify (or leave unmodified) each candidate neural network is based on the estimated relative fitness of the candidate neural network with respect to the estimated relative fitness of other candidate neural networks of the same epoch.

For example, a mutation parameter of a genetic algorithm can be adjusted based on the estimated relative fitness of a particular candidate neural network. The mutation parameter affects the likelihood of a mutation operation occurring with respect to the particular candidate neural network, the extent of the mutation operation, and/or the type of the mutation operation (e.g., which hyperparameter is modified by the mutation operation). Adjusting the mutation parameter may increase a likelihood of at least one preferred neural network characteristic (alternatively referred to herein as a "trait") being included in neural network(s) of subsequent epoch(s), decrease a likelihood of at least one disfavored neural network characteristic being included in neural network(s) of subsequent epoch(s), or both.

Alternatively, or in addition, a candidate neural network with lower estimated relative fitness can become extinct and discarded from consideration such that neural networks in subsequent epochs do not inherit traits of the extinct neural network. Discarding neural networks that have lower estimated relative fitness can be used to prune an evolutionary possibility space to remove evolutionary branches that are unlikely to lead to a reliable and high-performing neural network. For example, relatively fitter members (e.g., neural networks with higher estimated relative fitness) are less likely to become extinct and are more likely to participate in mutation and/or cross-over operations. As a result, the neuroevolutionary process can converge faster on a reliable and high-performing neural network to model the data set.

After the neuroevolutionary process converges on a neural network, the neural network can be output for use in analyzing another data set (or other data sets) related to the data set used to generate the neural network. For example, if the data set used to generate the neural network is time series data captured by a particular sensor coupled to a particular system, the neural network can be used to predict future sensor data values or future states of the particular system based on real-time sensor data from the particular sensor (or from similar sensors associated with other systems). Thus, the neuroevolutionary process automates creation of a software tool (e.g., a neural network) that can be used for a variety of purposes depending on the input data set used.

FIG. 1 illustrates a system 100 that includes a data agnostic model builder 122 to model data from a variety of data sources 102. In FIG. 1, the data agnostic model builder 122 is integrated within or executed by one or more computers 112. The computer(s) 112 receive data to be modeled (e.g., a data set 110) from any of a variety of data sources 102. FIG. 1 illustrates three data sources 102, including a sensor 104 coupled to a monitored device 105, a database 106, and a medical device 108. The three data sources 102 are illustrated as examples of the variety of data sources (and corresponding data types) that can be modeled using the data agnostic model builder 122. In other implementations, data obtained from more data sources, fewer data sources, and/or different data sources can be modeled using the data agnostic model builder 122. Generally, the data set 110 provided to the data agnostic model builder 122 is pre-processed to some extent, such as to exclude outlier values, to select or label a particular subset of the data, to normalize values, etc. Thus, the data set 110 is usually obtained from a memory (such as the database 106) rather than from a real-time data stream as may be output from the sensor 104 or the medical device 108. However, after the data set 110 has been processed to train a neural network 136, data from a real-time data stream, such as a second data set 138, can be provided to the neural network 136 for analysis.

In FIG. 1, the computer(s) 112 include memory 114 (e.g., one or more memory devices) and one or more processors 120. The processor(s) 120 are configured, via processor-executable instructions, special purpose circuits, or a combination thereof, to perform operations of the data agnostic model builder 122. The memory 114 stores data associated with the data agnostic model builder 122, such as grammars 116 and parameters 118, each of which is described further below. Additionally, in some implementations, the memory 114 can store the neural network 136 (or data representing the neural network 136) formed via the data agnostic model builder 122.

The data agnostic model builder 122 in FIG. 1 includes a plurality of functional modules, each of which can correspond to or include processor-executable instructions, special purpose circuits, or a combination thereof. In the implementation illustrated in FIG. 1, the functional modules of the data agnostic model builder 122 include a data set analyzer 124, a model building engine 126, a matrix mapper 128, a fitness calculator 130, an estimator generation engine 132, and a relative fitness estimator 134. In other implementations, the data agnostic model builder 122 includes a different set of functional modules. For example, two or more of the functional modules illustrated in FIG. 1 can be merged into a single module. To illustrate, the model building engine 126 and the estimator generation engine 132 perform similar operations (e.g., generating a neural network) using different data sets and different constraints. Thus, in some implementations, the functionality described herein as associated with the model building engine 126 and the estimator generation engine 132 can be combined into a single functional block. In yet other implementations, a single functional block illustrated in FIG. 1 can be divided into two or more functional blocks. Further, the data agnostic model builder 122 can utilize functions that are provided by underlying software, such as an operating system of the computer(s) 112, to perform certain operations, such as obtaining data, performing basic mathematical operations, storing data, controlling parallel execution of certain functions (e.g., at different processors 120 or different processing cores), etc.

The data set analyzer 124 is configured to receive input data, such as the data set 110, and to determine one or more characteristics of the input data. As a specific example, a user can select or designate the input data using a graphical user interface (GUI), such as GUI 142. The data agnostic model builder 122 is operable using a variety of types of input data (e.g., is data agnostic), and the data set analyzer 124 is used to facilitate selection of appropriate grammars 116, parameters 118, or other model building settings based on the specific content of the input data.

The data set analyzer 124 uses heuristics, a data classifier, or both, to determine characteristics of the input data that indicate a data type of the input data. For example, the data set 110 could include time-series data, text, image data, other data types, or combinations thereof (e.g., time-series data with associated text labels). In some implementations, the data set analyzer 124 also, or in the alternative, uses heuristics, the data classifier, or both, to identify a problem to be solved based on the input data, such as whether the neural network 136 is to be configured to classify input data or to predict a future state or value. In some implementations, the data set analyzer 124 can also, or in the alternative, determine a size of the input data, other characteristics associated with the input data, or a combination of the above.

The data set analyzer 124 provides information to the model building engine 126 based on the characteristics of the input data. For example, the data set analyzer 124 can instruct the model building engine 126 to use a particular subset of the parameters 118 to generate candidate neural networks of a population. In such examples, the parameters 118 can indicate a set of allowable hyperparameters of the candidate neural networks, ranges of allowable values of the hyperparameters, or both. Alternatively, the data set analyzer 124 stores the information based on the characteristics of the input data at a particular memory location that is accessible to the model building engine 126, the matrix mapper 128, or both.

The model building engine 126 is configured to generate an initial population of neural networks to undergo a neuroevolutionary process. The initial population is generated using a randomized process. For example, the architecture of each neural network can be randomly or pseudo-randomly selected from among a set of allowable architectures. One way to randomize generation of the initial population of neural networks is to assign a random value to a hyperparameter (or a set of hyperparameters), where the hyperparameters indicate, for example, a number of hidden layers of the neural network, an architecture of a layer or set of layers, a number of nodes in a layer or set of layers, an activation function of a node or layer, etc. In such implementations, the random values assigned to the hyperparameters specify the architecture of the neural network.

In some implementations, information provided by the data set analyzer 124 is used to weight the randomization process used by the model building engine 126. For example, when the data set analyzer 124 indicates that the data set 110 has particular characteristics, the model building engine 126 may favor one type of neural network architecture over another type of neural network architecture. In this example, a weighed randomization process can be used to generate the initial population, where the weighted randomization process weights the randomization process such that the more favored types of neural network architectures are more likely to be generated than less favored types of neural network architecture. In other implementations, the model building engine 126 generates the initial population of neural networks independently of information from the data set analyzer 124. For example, the model building engine 126 can generate an initial population of neural networks by randomly selecting the structure and other hyperparameters of each neural network of the population.

The model building engine 126 provides information describing the population of neural networks to the matrix mapper 128, the fitness calculator 130, or both. Alternatively, the model building engine 126 stores the information describing the population of neural networks at a particular memory location that is accessible to the model building engine 126, the fitness calculator 130, or both.

The matrix mapper 128 is configured to generate a matrix representation of the neural networks based on one of the grammars 116. In a particular implementation, the matrix representation of each neural network includes a set of rows and a set of columns. The columns correspond to hyperparameters, and the rows correspond to hidden layers of the neural network. In some implementations, the rows are descriptive of all of the layers of the neural network. However, generally each neural network of the population includes the same input layer and the same output layer, and as a result, it is sufficient for the rows of the matrix representations to represent the hidden layers of each neural network. Representing only the hidden layers reduces the amount of memory used to store the matrix representations and reduces the processing resources used by the estimator generation engine 132 and the relative fitness estimator 134 as compared to representing the input and output layers along with the hidden layers in the matrix representations.

The set of columns used to generate the matrix representations is specified by the grammars 116 (or grammar) used to generate the matrix representations. For example, if the data set 110 includes time-series data, the data set analyzer 124 can select a grammar 116 that identifies hyperparameters describing recurrent network layer architectures, such as RNN layers, LSTM layers, and GRU layers. In such examples, the selected grammar can also identify hyperparameters typical of interconnections to input and output layers, such as fully connected layers. In other examples, more layer architectures, fewer layer architectures, or different layer architectures can be specified by a particular grammar 116.

The matrix mapper 128 generates the matrix representation of a neural network by providing a value for each row/column pair. The values can include logical (e.g., binary) values, integers, floating point values, strings, or combinations thereof, for a single row. An example of a matrix representation of a neural network is further described with reference to FIG. 3.

The matrix mapper 128 provides the matrix representations to the estimator generation engine 132, the model building engine 126, or both. Alternatively, the matrix mapper 128 stores the matrix representations at a particular memory location that is accessible to the estimator generation engine 132, the model building engine 126, or both.

The fitness calculator 130 is configured to calculate a fitness value for one or more neural networks of a population. In a particular implementation, the fitness calculator 130 calculates a fitness value for each neural network of an initial population of neural networks and calculates a fitness value for none of or for fewer than all of the neural networks of a subsequent population of neural networks. For example, during an initial epoch, if the model building engine 126 generates one thousand neural networks to form an initial population, the fitness calculator 130 calculates one thousand fitness values—one per neural network of the initial population. Continuing this example, during a subsequent epoch, the model building engine 126 generates a subsequent population of neural networks via the neuroevolutionary process. The subsequent population generally includes the same number of neural networks as the initial epoch (although the subsequent population can include more or fewer neural networks). However, in the subsequent epoch, the fitness calculator 130 does not calculate any fitness values, or calculates fitness values for only a small subset of the subsequent population (e.g., for 10% of the subsequent population).

As explained above, calculating fitness values is a highly resource intensive operation. By omitting fitness value calculations or reducing the number of fitness value calculations performed during the subsequent epochs, the data agnostic model builder 122 saves processing resources and working memory, and, as a result can converge to a result (e.g., can generate the neural network 136) faster and/or with reduced resource consumption than model building processes that rely exclusively on fitness value calculations.

The estimator generation engine 132 uses the fitness values generated by the fitness calculator 130 and the matrix representations generated by the matrix mapper 128 as labeled training data to train a machine learning model that is used by the relative fitness estimator 134 to generate estimated fitness data. The trained machine learning model includes a neural network configured to process sequential data to generate a result, such as a 1D CNN or a neural network having one or more recurrent layers, or the trained machine learning model includes a flattening process and a machine learning model that is not configured to process sequential data to generate a result, such as a random forest or a feed-forward neural network). The estimator generation engine 132 trains the machine learning model by providing a matrix representation of a neural network as input to an untrained machine learning model to generate an output value. The output value is compared to the fitness value calculated for the neural network and a difference between the output value and the fitness value is used as an error value. The error value is reduced (e.g., optimized) by iteratively adjusting weights of the machine learning model using an optimization process, such as backpropagation. By modifying the weights of the machine learning model over several iterations, the machine learning model is trained in a manner that reduces the error value, which indicates that an estimated relative fitness value (or other relative fitness data) output by the relative fitness estimator 134 is closer to the actual calculated fitness value for the neural network.

The relative fitness estimator 134 is configured to use the trained machine learning model generated by the estimator generation engine 132 to generate estimated fitness data for the neural networks of a population. The estimated fitness data can be used by the model building engine 126 to control the neuroevolutionary process. To illustrate, in some implementations, the model building engine 126 uses the estimated fitness data to select neural networks to undergo mutation, cross-over, or both. The model building engine 126 can also, or in the alternative, use the estimated fitness data to select neural networks for extinction.

During each epoch of the neuroevolutionary process, it is desirable for the population (or at least some members of the population) to be improved (e.g., to become more fit). This goal is generally achieved by retaining, mutating, and/or breeding fitter neural networks, and by avoiding breeding of or discarding less fit neural networks. Calculated fitness values from the fitness calculator 130 can be used to rank the neural networks of a population in order to achieve this goal. However, it is not critical to achieving the goal that the fitness values exactly matches the calculated fitness value. Rather, it is sufficient for estimated fitness data to be used to sort or rank the neural networks into those that are likely to have higher fitness values relative to those that are likely to have lower fitness values. Thus, the output of the relative fitness estimator 134 need not be numerically identical to (or even similar to) the calculated fitness value as long as the output of the relative fitness estimator 134 tends to trend with the calculated fitness value. In some implementations, the estimated fitness data generated by the relative fitness estimator 134 can include an estimated fitness value for each neural network, a ranking value indicating an approximate fitness rank of the neural network with respect to one or more other neural networks, or both.

Generating estimated fitness data for a particular candidate neural network during a particular epoch using the relative fitness estimator 134 uses significantly fewer computing resources (e.g., working memory and processor time) than calculating the fitness value for the candidate neural network. Further, a similar savings of computing resources can be achieved for every epoch after the initial epoch. Accordingly, the data agnostic model builder 122 can generate the neural network 136 to model the data set 110 much faster and with lower computing resource utilization than techniques that rely on calculated fitness values.

After the data agnostic model builder 122 generates the neural network 136, the computer(s) 112 can use the neural network 136 to generate output 144 based on similar data (e.g., second data set 138) from the data sources 102. For example, the data set 110 can include historical data (and in some instances, data from multiple sources, such sensor readings from multiple sensors), and the data agnostic model builder 122 can generate a model (e.g., the neural network 136) based on the data set 110 to predict a future data value based on the second data set 138. To illustrate, the data set 110 can include vibration readings from a sensor coupled to a rotary device (e.g., a wind turbine), and the neural network 136 can be trained (based on the data set 110) to estimate, based on the second data set 138, how long it will be until a future vibration reading exceeds a threshold. In another example, the data set 110 can include historical data with labeled states (and in some instances, data from multiple sources, such as medical data from multiple patients), and the data agnostic model builder 122 can generate a model (e.g., the neural network 136) based on the data set 110 to assign a state label based on the second data set 138. To illustrate, the data set 110 can include labeled historical medical data for a set of patients, some of which have been diagnosed with a particular type of cancer as indicated by a data label and some of which are cancer free as indicated by a second data label. In this illustration, the second data set 138 can include medical data for a new patient, and the neural network 136 can be trained to assign a predicted label (e.g., cancer-free or not cancer-free) to the new patient based on the second data set 138.

The computer(s) 112 can provide output 144 via the GUI 142 to indicate the output of the neural network 136 based on the second data set 138. For example, the output 144 can be presented via a display device 140 to a user to assist the user in taking appropriate action based on the second data set 138.

In some implementations, the neural network 136 can also, or in the alternative, be provided to one or more second computer(s) 150 for use. As an example, the computer(s) 112 can generate the neural network 136 based on the data set 110, and the second computer(s) 150 can receive a third data set 154 from one or more other data sources 152 (e.g., data sources distinct from the data sources 102) and use the neural network 136 to analyze the third data set 154 to generate output 160. As with the output 144, the output 160 can be displayed via a GUI 158 on a display device 156 to notify a user or help the user take appropriate action based on the third data set 154. In this example, the other data sources 152 are distinct from the data sources 102; however, the other data sources 152 of the same type or a similar type as the data source 102 that generated the data set 110.

In this manner, the data agnostic model builder 122 improve the functionality of the computer(s) 112 by enabling the computer(s) 112 to generate a neural network (e.g., the neural network 136) to model a data set 110 in a manner that uses significantly fewer computing resources (e.g., working memory, processor time, etc.) than neural network generation processes that calculate the fitness of candidate neural networks for multiple epochs. The neural network 136 itself is software or data representing parameters (e.g., weights and hyperparameters) that can be executed to analyze other data sets, such as the second data set 138, the third data set 154, or both.

Figure 2:
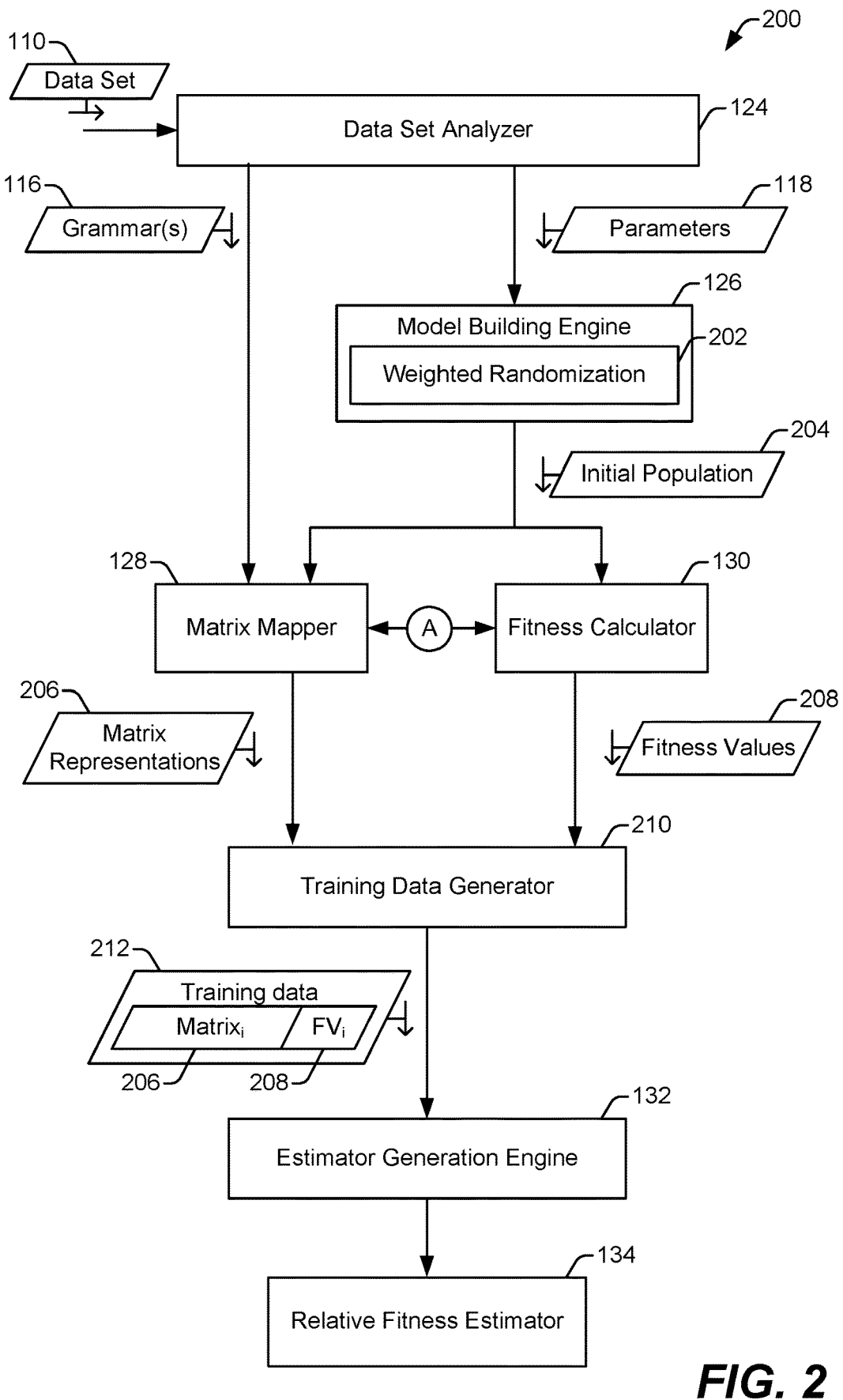
FIG. 2 illustrates a particular example of stages of operation of the data agnostic model builder of FIG. 1 during training of a relative fitness estimator to estimate relative fitness of a neural network.

FIG. 2 illustrates a particular example 200 of stages of operation of the data agnostic model builder of FIG. 1 during training of the relative fitness estimator 134 to estimate relative fitness of a neural network. In FIG. 2, the data set analyzer 124 obtains (e.g., receives or accesses) the data set 110. For example, the data set 110 can be specified by a user, such as by selecting the data set 110 using a file system browser or another graphical user interface. The data set analyzer 124 determines characteristics of the data set 110. For example, the data set analyzer 124 can determine a type or types of data within the data set 110, such as whether the data set 110 includes text data, image data, audio data, integers, floating point values, binary data (e.g., executable code), etc. The data set analyzer 124 can also determine whether a discernable inter-relation exists among the data, such as whether two or more data elements correspond to a time series of values.

The data set analyzer 124 provides parameters 118 to the model building engine 126 based on the analysis of the data set 110. The parameters 118 specify settings or other control inputs that control operation of the model building engine 126. For example, the parameters 118 can identify which column of data of the data set 110 corresponds to a data label. In this example, the model building engine 126 attempts to form a neural network that uses other data from the data set 110 as input data and generates an output that corresponds to a data label from the identified column. As another example, the data set analyzer 124 can identify a particular column of data of the data set 110 as a target to be predicted. In this example, the model building engine 126 attempts to form a neural network that uses other data from the data set 110 as input data and generates a predicted value of the identified column.

The parameters 118 can also indicate limits or weights to be applied during the neuroevolutionary process. In some implementations, the data set analyzer 124 selects, based on one or more characteristics of the data set 110, one or more architectural parameters or other hyperparameters of an automated model generation process of the model building engine 126. For example, the parameters 118 can indicate or correspond to weights that are applied by the model building engine 126 to generate an initial population 204 of neural networks via a weighted randomization process 202. In this example, the weighted randomization process 202 determines the architecture (and other hyperparameters) of each neural network of the initial population based in part on the parameters 118.

To illustrate, if the data set analyzer 124 determines that the data set 110 includes time series data, the parameters 118 can indicate that the weighted randomization process 202 should favor the randomized production of neural networks that have recurrent structures, should disfavor the randomized production of neural networks that do not have recurrent structures, or both. In this illustrative example, the initial population 204 would likely include more neural networks with recurrent structures than non-recurrent neural networks (though some non-recurrent neural networks may be present since the model building engine 126 randomizes the operation of forming the initial population 204).

The data set analyzer 124 also compares the characteristic(s) of the data set 110 to a set of rules that map the characteristic(s) to one or more of the grammars 116. Each of the grammars 116 indicates corresponding architectural parameters and/or other hyperparameters. The grammars 116 indicate how the matrix mapper 128 is to generate a matrix representation of a neural network. For example, a particular grammar indicates which hyperparameter is represented by each column of a matrix representations. The hyperparameters include one or more of an interconnection scheme associated with a set of layers, an activation function associated with at least one node of the set of layers, a number of nodes of the set of layers, other architectural parameters or hyperparameters, or a combination thereof. In a particular implementation, the data set analyzer 124 selects a single grammar (or a set of grammars) for generating matrix representations of all of the neural networks generated by the neuroevolutionary process. The data set analyzer 124 outputs the grammar(s) 116 or data identifying the grammar(s) 116 for use by the matrix mapper 128.

The model building engine 126 performs an automated model generation process to generate the initial population 204 of neural networks. For example, the model building engine 126 uses the weighted randomization process 202 to generate the initial population 204. The weighted randomization process 202 adjusts the probability of generation of neural networks having particular features based on the parameters 118. For example, the parameters 118 can include architectural parameter weights that are used to adjust the probability of generation of neural networks having various architectural features. The weighted randomization process 202 can also adjust the probability of generation of neural networks having other hyperparameters based on the parameters 118.

The matrix mapper 128 uses the grammar(s) 116 to generate matrix representations 206 of the neural networks of the initial population 204. Each of the matrix representations 206 includes a plurality of columns and a plurality of rows. Each of the columns corresponds to a hyperparameter indicated by the grammar(s) 116, and each of the rows correspond to one or more layers of the corresponding neural network. A value corresponding to a column/row pair indicates information related to the hyperparameter for the one or more layers. For example, the value can indicate whether the hyperparameter is TRUE (e.g., is present in) for the one or more layers. To illustrate, the matrix representations 206 can include two or more columns corresponding to activation functions. In this illustrative example, if a particular layer of a neural network uses a particular activation function, the row of the matrix representation corresponding to the particular layer includes a value indicating TRUE (e.g., a one (1)) in the column corresponding to the particular activation function. Likewise, the row of the matrix representation corresponding to the particular layer can also include values indicating FALSE (e.g., a zero (0)) in the column or columns corresponding to the other activation functions.

In some implementations, one or more of the columns can include information other than presence or absence of the corresponding hyperparameter in one or more layers of the neural network. To illustrate, a particular column can include an integer value indicating a number of nodes of the corresponding layer(s).

In some implementations, each of the neural networks of the initial population 204 and of each subsequent population (e.g., during later epochs) includes the same input layer and the same output layer. In such implementations, the matrix representations 206 describe only the hidden layers of each neural network. For example, two or more rows of the matrix representation of a particular neural network correspond to hidden layers of the particular neural network.

The fitness calculator 130 calculates fitness values 208 for the neural networks of the initial population 204. Each fitness value is based on an error value generated based on output of a respective neural network of the initial population 204, where the error value indicates a difference between one or more values of the data set 110 and the output of the respective neural network. As a specific example, the fitness calculator 130 selects a subset of the data set 110 for use as validation data (also referred to herein as test data). In this example, the fitness calculator 130 provides one or more data entries of the validation data as input to a neural network compares an output generated by the neural network to an expected value (indicated in the one or more data entries). The fitness calculator 130 calculates an error value of the neural network for the one or more data entries based on the difference between the output generated by the neural network and the expected value. The fitness calculator 130 repeats the process above to determine a set of error values based on data entries of the validation data. The fitness calculator 130 calculates a fitness value for the neural network based on the set of error values.

In the example 200, a training data generator 210 combines the matrix representations 206 and the fitness values 208 to generate training data 212. For example, the training data generator 210 matches the fitness value 208 of a particular neural network with the matrix representation 206 of the particular neural network to form a training data entry of the training data 212. Thus, each training data entry can be used as supervised training data including a matrix representation and a corresponding fitness value.

The estimator generation engine 132 trains a machine learning model using the training data 212 to generate the relative fitness estimator 134. For example, the estimator generation engine 132 uses backpropagation or other optimization techniques to modify link weights of the machine learning model to reduce the machine learning model's error in making fitness value predictions based on matrix representations of neural networks. To illustrate, a matrix representation of a particular neural network is provided as input to the machine learning model, and the machine learning model outputs a predicted fitness value of the particular neural network. An error value is calculated based on a difference between the predicted fitness value and the fitness value for the particular neural network calculated by the fitness calculator 130. The link weights of the machine learning model are modified (e.g., based on stochastic gradient decent) to reduce the error value. The training process continues until the machine learning model is capable of predicting fitness values with error that is less than an error limit or until a particular number of training iterations have been performed.

In a particular implementation, the machine learning model has a recurrent structure. In this particular example, due to the recurrent structure, the relative fitness estimator 134 is able to receive a matrix representation of a neural network as input in a row-by-row manner without losing information about interrelationships among layers of the neural network. Because the relative fitness estimator 134 accounts for interrelationships among layers, the matrix representation 206 can have different numbers of rows, and the neural networks of a population can have different numbers of layers. For example, a first neural network of the initial population 204 can have a single hidden layer, resulting in the matrix representation of the first neural network having a single row. In this example, a second neural network of the initial population 204 can have two hidden layers, resulting in the matrix representation of the second neural network having two rows. Further, a third neural network of the initial population 204 can have three hidden layers, resulting in the matrix representation of the third neural network having three rows. These examples are merely illustrative, and in other implementations, the neural networks of the initial population 204 (as well as subsequent populations associated with later epochs) can have any number of hidden layers (generally bound by some upper limit indicated in the parameters 118 or other settings associated with the data agnostic model builder 122 of FIG. 1).

When a matrix representation includes two or more rows, the rows are input to input layer of the relative fitness estimator 134 one row at a time and sequentially in an order that correspond to the order of the layers in the neural network. For example, a first row corresponding to a first hidden layer is provided to the input layer, then a second row corresponding to a second hidden layer is provided to the input layer. In this example, the second hidden layer is immediately adjacent to (e.g., directly connected via one or more links with no intervening nodes) the first hidden layer in the neural network.

Figure 3:
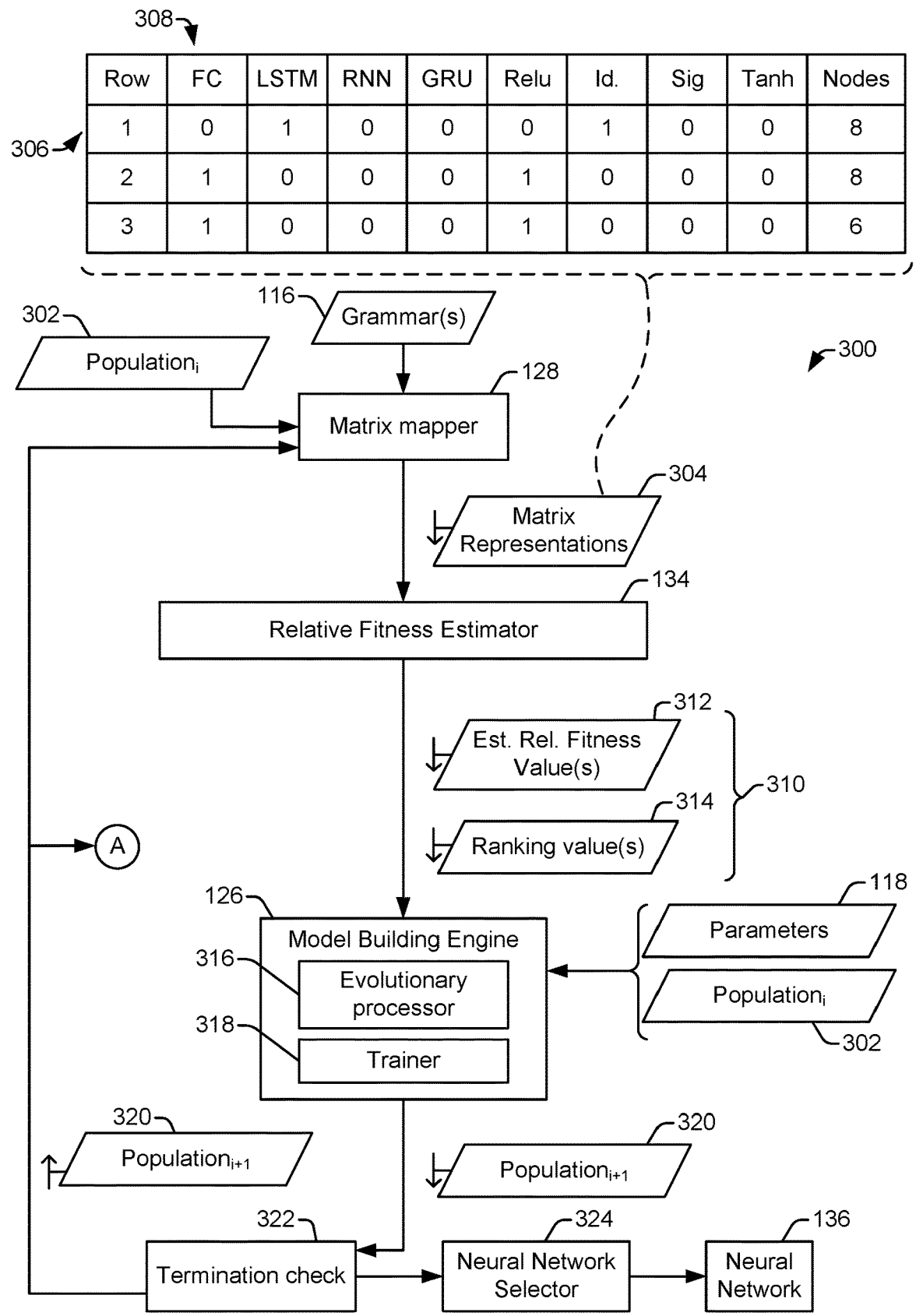
FIG. 3 illustrates a particular example of stages of operation of the data agnostic model builder of FIG. 1 during generation of a neural network using the relative fitness estimator of FIG. 2.

FIG. 3 illustrates a particular example of stages of operation of the data agnostic model builder 122 of FIG. 1 during generation of the neural network 136 using the relative fitness estimator 134 of FIG. 2. The stages of operation illustrated in FIG. 3 are performed iteratively until a termination criterion is satisfied. In FIG. 3, the matrix mapper 128 obtains (e.g., receives or access from a memory) the data describing a population 302 (labeled "Population," in FIG. 3) of neural networks. For the initial iteration of the stages of operation illustrated in FIG. 3, the population 302 is the initial population 204 generated by the model building engine 126 of FIG. 2. For subsequent iterations, the population 302 is the most recent population 320 (labeled "Population$_{i+1}$" in FIG. 3) generated by the model building engine 126 using one or more evolutionary processes, as described further below.

The matrix mapper 128 uses the grammar(s) 116 selected by the data set analyzer 124 of FIG. 2, to generate matrix representations 304 of the neural networks of the population 302. FIG. 3 illustrates a non-limiting example of a matrix representation of one of the neural networks of the population 302. The example matrix representation of FIG. 3 includes a plurality of columns 308 and a plurality of rows 306. Each of the rows 306 corresponds to one or more layers of the neural network, and the rows 306 are arranged in an order corresponding to the order of the one or more layers in the neural network. For example, in FIG. 3, a first row (labeled Row "1") corresponds to and represents a hidden layer of the neural network closest to the input layer (i.e., the first hidden layer of the neural network). Likewise, a third row (labeled Row "3") corresponds to and represents a hidden layer of the neural network closest to the output layer (i.e., the last hidden layer of the neural network). A second row (labeled Row "2") corresponds to and represents a hidden layer of the neural network that is between the first hidden layer and the last hidden layer.

Although three rows (representing three hidden layers of the neural network) are illustrated in FIG. 3, the different neural networks of the population 302 can have more than three hidden layers or fewer than three hidden layers, and as a result, the matrix representations 304 can include one or more matrix representations with more than three rows, and/or one or more matrix representations with fewer than three rows. For example, a first neural network of the population 302 can have two hidden layers and can be represented by a matrix representation having two rows. In this example, a second neural network of the population 302 can have seven hidden layers and can be represented by a matrix representation having seven rows. In this example, other neural networks of the population 302 can include other numbers of hidden layers represented by corresponding numbers of rows. Further, in some implementations, a single row 306 can represent more than one layer of the corresponding neural network. For example, multiple adjacent fully connected layers can be represented by a single row with a value in a column indicating how many layers the row represents.

Each of the columns 308 corresponds to a hyperparameter allowed by the grammar(s) 116. The first four columns in the example matrix representation illustrated in FIG. 3 correspond to structural features, including (from left to right) a fully connected ("FC") structure, a long short-term memory ("LSTM") structure, a recurrent neural network ("RNN") structure, and a gated recurrent unit ("GRU") structure. In this example, no layer or set of layers represented by a row of the matrix representation can use more than one of the structural features. However, since the structural features include several types of recurrent structures, the structural features are defined to be mutually exclusive with respect to one another.

The next four columns in the example matrix representation illustrated in FIG. 3 correspond to activation functions, including (from left to right) a rectified linear unit ("Relu") function, an identity ("Id.") function, a sigmoid ("Sig") function, and a hyperbolic tangent ("Tanh") function. In this example, no layer or set of layers represented by a row of the matrix representation can use more than one of the activation functions; thus, the activation functions are mutually exclusive with respect to one another.

The last column in the example matrix representation illustrated in FIG. 3 corresponds to a number of nodes in the layer or set of layers represented by a row of the matrix representation. As explained above, in some implementations, an additional column can be used to indicate that the neural network includes two or more identical layer represented by the row.

Although nine columns 308 are illustrated in the example of FIG. 3, in other examples the matrix representations 304 can include more than nine columns 308 or fewer than nine columns 308. The grammar(s) 116 indicate or specify which features are to represented by the matrix representations 304. Other examples of structural features that can be represented include but are not limited to: convolutional layers with varying kernel size, stride, dilation, or padding; pooling layers; multi-dimensional convolution layers; transpose layers; reflection layers; dropout layers; and/or embedding layers.

A value at the intersection of each row/column pair in the example matrix representation illustrated in FIG. 3 indicates information related to the hyperparameter corresponding to the column for the one or more layers corresponding to the row. For example, for Row 1, a value of zero (0) is present in the FC column, which indicates that structural features associated with the FC column is not present in the one or more layers represented by Row 1. Thus, the one or more layers corresponding to Row 1 are not fully connected layers. Continuing this example, a value of one (1) is present in the LSTM column of Row 1, which indicates that structural features associated with the LSTM column is present in the one or more layers represented by Row 1. Thus, the one or more layers corresponding to Row 1 are LSTM layers. The values of Row 1 corresponding to the other structural features are zeroes indicating that the other structural features are not present in the one or more layers represented by Row 1 (e.g., because the structure features are defined to be mutually exclusive).

Continuing along Row 1, a value of zero (0) is present in the Relu column, which indicates that the one or more layers represented by Row 1 do not use a rectified linear unit (Relu) activation function. Further, a value of one (1) is present in the Id. column of Row 1, which indicates that the one or more layer represented by Row 1 use an identity (Id.) activation function. The values of Row 1 corresponding to the other activation functions are zeroes indicating that the other activation functions are not present in the one or more layers represented by Row 1 (e.g., because each layer or set of layers represented by a row use a single activation function).

A value of eight (8) in the Nodes column of Row 1 indicates that the one or more layers represented by the Row 1 include eight (8) nodes. As explained above, in some implementations an additional column can be present to indicate how many layers are represented by the Row 1. For example, if the grammar(s) 116 indicate that neural networks of the population 302 can use pooling, the Row 1 can represent a pooling structure that includes multiple pooling layers. In this example, the number of pooling layers used by the neural network represented by the example matrix representation of FIG. 3 would be indicated in another additional column.

After the matrix mapper 128 generates the matrix representations 304, the relative fitness estimator 134 is used to rank the neural networks based on the estimated relative fitness of each. In a particular example, the relative fitness estimator 134 includes a trained machine learning model (e.g., a neural network or more than one neural network) having a recurrent structure. In this particular example, each matrix representation is provided as input to the relative fitness estimator 134 in a row-by-row manner. For example, Row 1 of the example matrix representation illustrated in FIG. 3 is provided as input to the relative fitness estimator 134. Row 2 is provided as input after Row 1, and Row 3 is provided as input after Row 2. The relative fitness estimator 134 generates as output estimated fitness data 310 indicating an estimate of fitness of the neural network represented by the matrix representation. The estimated fitness data 310 can include, for example, an estimated relative fitness value 312 of the neural network, an estimated ranking value 314 (relative to other neural networks of the population 302) of the neural network, or both.

In some implementations, the relative fitness estimator 134 is configured to receive two or more matrix representations 304 as input, to estimate the relative fitness of the two or more neural networks corresponding to the matrix representations 304, and provide as output the ranking values 314 indicating the relative ranking of the two or more neural networks. For example, the relative fitness estimator 134 can execute two or more instances of the trained machine learning model in parallel, each using different matrix representations 304 as input. In this example, each instance of the trained machine learning model generates output indicative of relative fitness of a corresponding neural network, and an aggregation or ranking layer of the relative fitness estimator 134 evaluates the outputs of the instances of the trained machine learning model to generate the ranking values 314, where the ranking values 314 indicate which of the two or more neural networks is expected to be fitter.

To illustrate, the number of instances of the trained machine learning model executed in parallel can be equal to or less than the number of neural networks of the population 302. As a specific, non-limiting example, the population 302 can include one thousand (1000) neural networks, and one thousand (1000) instances of the trained machine learning model can executed in parallel to estimate relative fitness of each of the neural networks of the population 302. In this example, the ranking values 314 can indicate the relative ranking (in terms of expected fitness) of each of the 1000 neural networks, or the ranking values 314 can identify or indicate a subset of the population 302 that is expected to be fittest (e.g., the top 50% in terms of fitness). As another specific, non-limiting example, the neural networks of the population 302 can be evaluated in pairs by two (2) instances of the trained machine learning model, and the ranking values 314 for each pair can indicate which neural network of the pair is expected to be fitter.

The model building engine 126 includes an evolutionary processor 316 and a trainer 318. The model building engine 126 uses the estimated fitness data 310 and the parameters 118 to control operations performed by the evolutionary processor 316 on neural networks of the population 302. The specific type or types of operations performed on a particular neural networks (or set of neural networks), the extent of the operations performed on a particular neural networks (or set of neural networks), or both, is at least partially based on the estimated fitness data 310. For example, the evolutionary processor 316 can use a weighted randomization process to select particular neural networks for mutation and crossover operations. In this example, the likelihood of each neural network of the population 302 being randomly selected is weighted according to the estimated fitness data 310. In another example, some neural networks may be removed from the population 302 or prevented from participating in mutation or cross-over operations as a result of having a relative low ranking value. Generally, neural networks with higher ranking values 314 or higher relative fitness values 312 contribute more to the formation of the next population (e.g., the population 320 in FIG. 3).

As a result of the evolutionary operations, the population 302 is modified to form the population 320. For example, the population 320 includes new neural networks (e.g., child neural networks) that were not present in the population 302. Likewise, the population 302 includes some neural networks that are not present in the population 320. In some implementations, the trainer 318 is used to train at least a selected subset of the population 320. For example, at least the new neural networks can undergo some training (e.g., backpropagation training) via the trainer 318 to adjust link weights of the new neural networks.

In FIG. 3, if another iteration of the stages of operation of the data agnostic model builder 122 is to be performed, the population 320 is provided to the matrix mapper 128 to start the next iteration. The stages of operation of the data agnostic model builder 122 include a termination check 322, which in FIG. 3 is illustrated as occurring after the population 320 is formed; however, in other implementations, the termination check 322 can occur at other stages of operation. In some implementations, the stages of operation include multiple termination checks 322, which stop iteration of the data agnostic model builder 122 and output the neural network 136. The termination check 322 determines whether a termination condition is satisfied, and if the termination condition is satisfied, cause a neural network selector 324 to select one or more neural networks from a final population (e.g., the population 320 in FIG. 3) and output data identifying one or more selected neural networks as a candidate neural network based on the data set 110. The termination condition can be satisfied when a number of iterations performed is equal to an iteration count threshold, when a fitness value 208 of a particular neural network is greater than or equal to a fitness threshold, when a representative fitness value (e.g., an average of one or more fitness values 208) is greater than or equal to a fitness threshold estimate, when an estimated relative fitness value 312 of a particular neural network is greater than or equal to a relative fitness threshold, when a representative estimated relative fitness value (e.g., an average of one or more estimated relative fitness values 312) is greater than or equal to a relative fitness threshold, or when another condition indicates that further iterations are not warranted.

When the termination condition is satisfied, the neural network selector 324 selects the one or more candidate neural networks from the final population. In this context, the "final population" is the population being processed by the data agnostic model builder 122 when a determination is made that the termination condition is satisfied. In a particular implementation, the neural network selector 324 selects the neural network based on a section value, such as the ranking values 314 associated with neural networks of the final population, the estimated relative fitness values 312 associated with the neural networks of the final population, or fitness values 208 associated with the neural networks of the final population.

Depending on when the determination is made that the termination condition is satisfied, the neural network selector 324 may not have access to the selection value, in which case the neural network selector 324 can cause another functional module of the data agnostic model builder 122 to evaluate the neural networks of the final population to generate the selection values. For example, if the neural network selector 324 uses the fitness values 208 as the selection value, the neural network selector 324 can prompt the fitness calculator 130 to calculate fitness values 208 for the neural networks of the final population and use the calculated fitness values 208 to select the candidate neural network 136. As another example, the neural network selector 324 can prompt the relative fitness estimator 134 to generate estimated fitness data 310 for the final population. In this example, the neural network selector 324 can use the estimated fitness data 310 to select the neural network 136. In some implementations, the neural network selector 324 can use the estimated fitness data 310 to select a subset of the final population for which fitness values 208 are to be calculated. For example, the ten (10) highest ranked neural networks of the final population based on the estimated fitness data 310 can be provided to the fitness calculator 130 to calculate fitness values 208, which are used to select the neural network 136.

When the termination condition is not satisfied, another iteration of the stages of operation illustrated in FIG. 3 is performed. Additionally, in some implementations, a subset of the population 320 can be used to update the relative fitness estimator 134. For example, a portion of the population 320 can be provided (as illustrated by off page reference A in FIGS. 2 and 3) to the matrix mapper 128 and the fitness calculator 130. In this example, the matrix mapper 128, the fitness calculator 130, and the training data generator 210 use a portion of the population 320 to generate new training data 212 that is used to update the relative fitness estimator 134. The portion of the population 320 used to update the relative fitness estimator 134 is selected to improve the accuracy of the relative rankings generated by the relative fitness estimator 134. Generally, the most significant improvements in accuracy of the relative rankings can be achieved by improving accuracy at the ends, such as by using one or more highest ranking neural networks of the population 320, using one or more lowest ranking neural networks of the population 320, or some of the highest and some of the lowest. To achieve the most efficient operation in terms of computing resources used, only the one or more highest ranking neural networks of the population 320 may be used since the lowest ranked neural networks have the least impact on the populations in future epochs due to the weighting based on ranking used by the evolutionary processor 316.

Using the data agnostic model builder 122 described with reference to FIGS. 2 and 3 significantly reduces the amount of computing resources used to generate a neural network (e.g., the neural network 136) via the neuroevolutionary process by using the relative fitness estimator 134, rather than the fitness calculator 130, to estimate the relative fitness of the neural networks of each population during each epoch after the initial epoch. After the data agnostic model builder 122 generates the neural network 136, the neural network 136 can be output for use in analyzing another data set (or other data sets) related to the data set 110 used to generate the neural network 136. Thus, the data agnostic model builder 122 efficiently automates creation of a software tool (e.g., the neural network 136) that can be used for a variety of purposes depending on the input data set used.

Figure 4:
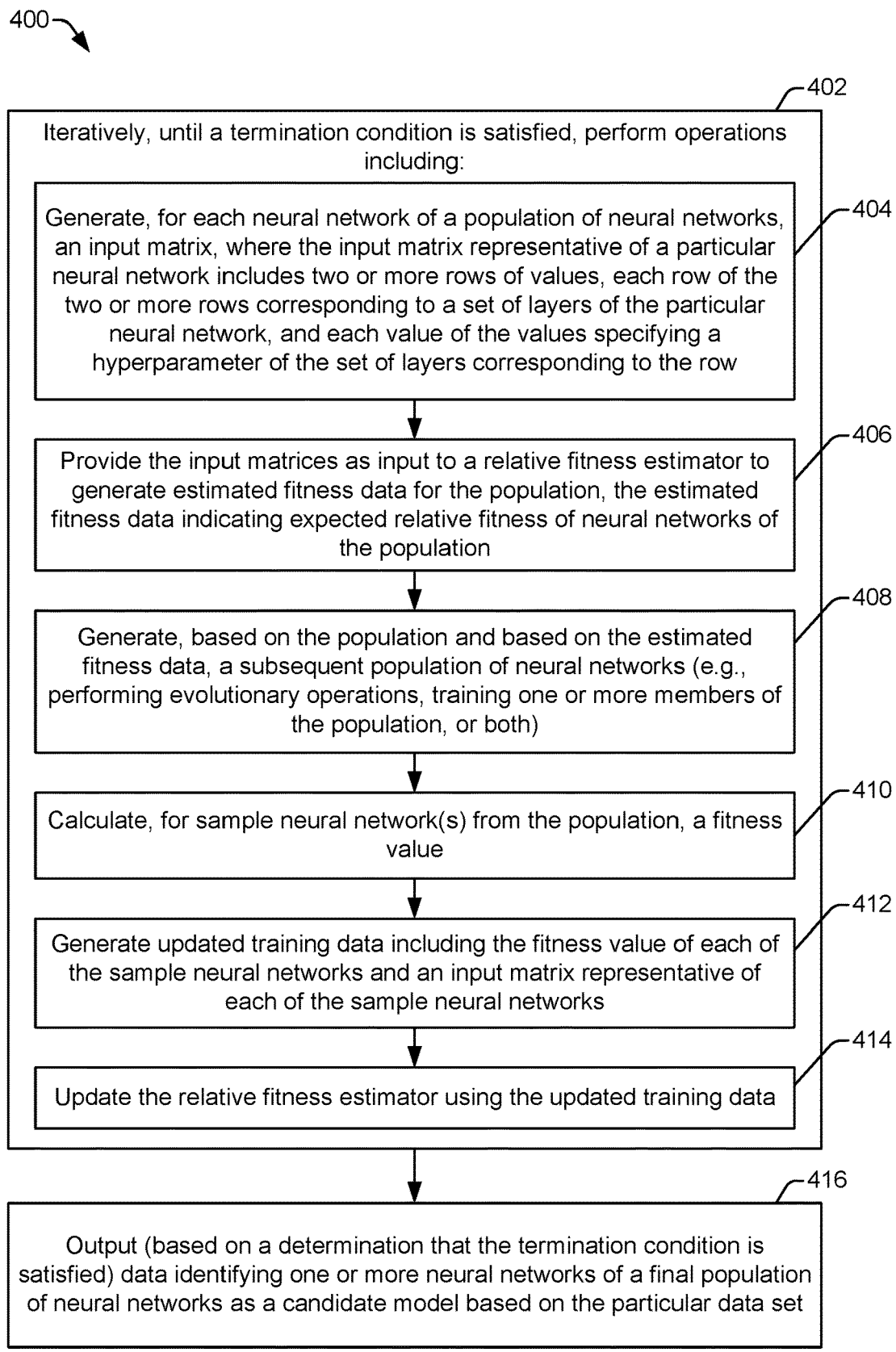
FIG. 4 illustrates a flowchart of a particular example of a method of generating a neural network.

FIG. 4 illustrates a flowchart of a particular example of a method 400 of generating a neural network. The method 400 corresponds to operations performed by the computer(s) 112 executing instructions corresponding to the data agnostic model builder 122 based on the data set 110.

The method 400 includes, at 402, iteratively performing a set of operations until a termination condition is satisfied. The termination condition is satisfied when a particular number of iterations have been performed, when one or more neural networks of a population of neural networks are determined to be satisfactory (e.g., satisfy a fitness threshold), when the data agnostic model builder 122 has converged (e.g., variation from iteration to iteration satisfies a convergence threshold), or when another condition indicates that further iterations are unnecessary or will be unproductive.

In the example illustrated in FIG. 4, the operations performed iteratively include, at 404, generating a matrix representation for each neural network of a population of neural networks. For example, the matrix mapper 128 can generate the matrix representations 304 of FIG. 3 based on the neural networks of the population 302 and based on the grammar(s) 116. The matrix representation of a particular neural network includes two or more rows of values. Each row corresponds to a set of layers (e.g., one or more layers) of the particular neural network, and each value specifies a hyperparameter of the set of layers. It should be understood that in some data structures, a matrix can be represented as a set of delimited vectors (e.g., vectors separated by semicolons or other delimiters), and in such data structures, the rows of the matrix representation correspond to the delimited vectors.

In the example illustrated in FIG. 4, the operations performed iteratively also include, at 406, providing the matrix representations as input to a relative fitness estimator to generate estimated fitness data for neural networks of the population. For example, the matrix representations 304 of FIG. 3 can be provided as input to the relative fitness estimator 134. The estimated fitness data are based on expected fitness of neural networks predicted by the relative fitness estimator.

In the example illustrated in FIG. 4, the operations performed iteratively further include, at 408, generating, based on the population of neural networks and based on the estimated fitness data, a subsequent population of neural networks. For example, the evolutionary processor 316 of the model building engine 126 can perform various evolutionary operations using members of the population 302 to generate the population 320. In this example, the evolutionary operations performed and the neural networks used for the evolutionary operations are based on the estimated fitness data 310 and the parameters 118. Generating the population 320 of neural networks can also include using the trainer 318 to train (e.g., adapt link weights) of one or more of the neural networks.

In the example illustrated in FIG. 4, the operations performed iteratively also include, at 410, calculating a fitness value for one or more sample neural networks from the subsequent population (e.g., the population 320 of FIG. 3). A fitness values is calculated using an error value based on output of a sample neural networks, where the error value indicates a difference between one or more values of the data set and the output of the sample neural networks. For example, the fitness calculator 130 of FIGS. 1 and 2 can calculate a fitness values for a sample neural network by providing test data of the data set 110 as input to the sample neural network and comparing an output result from the sample neural network to an expected value indicated in the test data to determine an error value. In this example, the error value, potentially along with other error values based on other test data, is used to determine the fitness value of the neural network.

In the example illustrated in FIG. 4, the operations performed iteratively include, at 412, generating updated training data indicating the fitness values and, for each fitness value, a matrix representation of a neural network associated with the fitness value. For example, the training data generator 210 of FIG. 2 can combine matrix representations 206 and the calculated fitness values 208 for the one or more sample neural networks from the subsequent population (e.g., the population 320 of FIG. 3) to generate updated training data 212.

In the example illustrated in FIG. 4, the operations performed iteratively further include, at 414, updating the relative fitness estimator using the updated training data. For example, the estimator generation engine 132 of FIG. 2 can use the updated training data 212 based on the one or more sample neural networks from the subsequent population (e.g., the population 320 of FIG. 3) to generate an updated relative fitness estimator 134. In this example, the updated relative fitness estimator 134 can be used to determine estimated fitness data 310 of the population 320, of subsequent populations, or both.

In the example illustrated in FIG. 4, the method 400 also includes, at 416, based on a determination that the termination condition is satisfied, outputting data identifying one or more neural networks of a final population of neural networks as a candidate neural network based on the data set. The final population is the population under consideration by the data agnostic model builder when the determination that the termination condition is satisfied is made. The data identifying one or more neural networks (e.g., the neural network 136 of FIG. 1) can be sent to the display device 140, to another computer, such as the second computer(s) 150, or both. The one or more neural networks (e.g., the neural network 136 of FIG. 1) can subsequently be used to evaluate other data, such as the second data set 138 or the third data set 154 of FIG. 1. Accordingly, the method 400 provides an automated method of generating a neural network (e.g., software or software configuration information) that can be used for a variety of purposes, such as state labeling, state or value prediction, pattern recognition, etc. Using the relative fitness estimator 134 to rank neural networks of a population (e.g., the population 302 of FIG. 3) can significantly reduce computing resources required to automatically generate a neural network relative to model building processes that calculate fitness of the neural networks of a population in each iteration.

Figure 5:
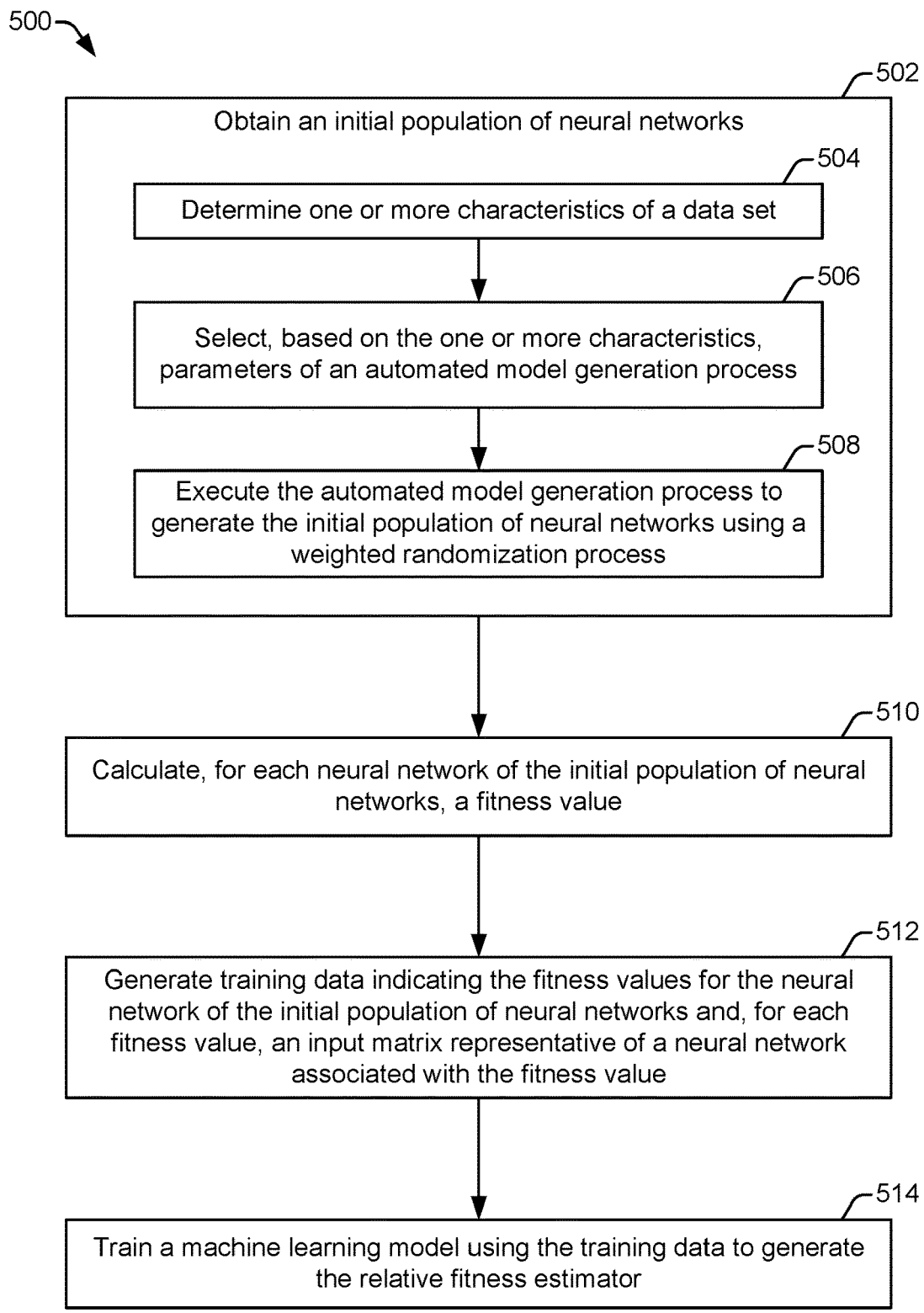
FIG. 5 illustrates a flowchart of a particular example of a method of generating a relative fitness estimator trained to estimate relative fitness of neural networks.

FIG. 5 illustrates a flowchart of a particular example of a method 500 of generating a relative fitness estimator that is trained to estimate relative fitness of neural networks. The method 500 corresponds to operations performed by the computer(s) 112 executing instructions corresponding to the data agnostic model builder 122 based on the data set 110.

The method 500 includes, at 502, obtaining an initial population of neural networks. For example, the model building engine 126 of FIGS. 1 and 2 can generate the initial population 204 based on the parameters 118 provided by the data set analyzer 124 using a weighted randomization process 202.

In the example illustrated in FIG. 5, obtaining the initial population includes determining one or more characteristics of the data set at 504, and based on the one or more characteristics, selecting one or more parameters of an automated model generation process, at 506. For example, the data set analyzer 124 evaluates the data set 110 of FIGS. 1 and 2 to determine characteristics of the data set 110 and selects the parameters 118 based on the characteristics of the data set 110. The parameters 118 can include, for example, architectural parameters that are used to guide generation of the initial population. The parameters 118 can also include other settings that are used by the data agnostic model builder 122 to guide the process of generating the neural network 136, such as information specifying the termination condition, information delineating test data of the data set 110 from training data of the data set 110, etc.

In the example illustrated in FIG. 5, obtaining the initial population also includes, at 508, executing the automated model generation process to generate the initial population of neural networks using a weighted randomization process. For example, the model building engine 126 of FIGS. 1 and 2 generates the initial population 204 using the weighted randomization process 202. In a particular implementation, the one or more parameters are used to weight the weighted randomization process to adjust a probability of generation of neural networks of the initial population 204 having particular features.

The method 500 includes, at 510, calculating a fitness value for each neural network of the initial population. For example, the fitness calculator 130 of FIGS. 1 and 2 calculates the fitness values 208 based on the initial population 204. Each fitness value is based on an error value generated based on output of a respective neural network of the initial population, where the error value indicates a difference between one or more values of the data set 110 and the output of the respective neural network of the initial population 204.

The method 500 also includes, at 512, generating training data indicating the fitness values for the neural network of the initial population and, for each fitness value, a matrix representation of a neural network associated with the fitness value. For example, the matrix mapper 128 of FIGS. 1-3 generates matrix representations 206 of the initial population 204, and the training data generator 210 combined the matrix representations 206 with corresponding fitness values 208 to generate the training data 212.

The method 500 includes, at 514, training a machine learning model using the training data to generate the relative fitness estimator. For example, the estimator generation engine 132 of FIGS. 1 and 2 generates the relative fitness estimator 134 using the training data 212. Accordingly, the method 500 provides an automated method of generating a relative fitness estimator based on a particular data set (e.g., the data set 110), where the relative fitness estimator is trained to estimate relative fitness of various neural network. The relative fitness estimator can be used in an automated model building process to perform some operations, such as estimating fitness values, that would otherwise be performed using a fitness calculator. Calculating fitness values using a fitness calculator can use significant computing resources in each epoch of a model building process. Thus, replacing to the fitness calculator with the relative fitness estimator can significantly reduce computing resources required to automatically generate a neural network.

Figure 6:
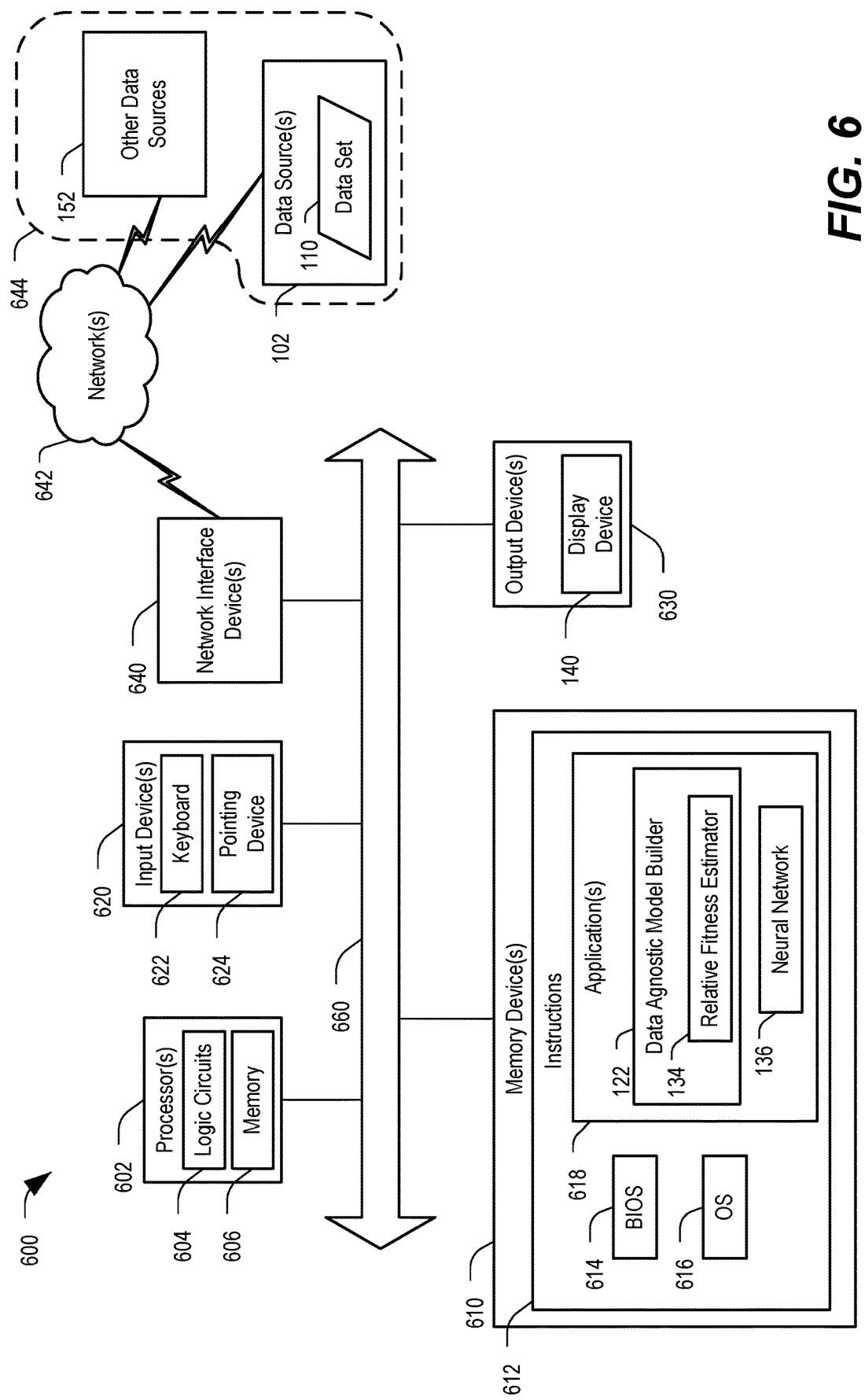
FIG. 6 illustrates a particular example of a computer system including hardware and software configured to perform automated model building operations, including generating a relative fitness estimator trained to estimate relative fitness of a neural network and generating a neural network.

FIG. 6 is a block diagram of a particular computer system 600 configured to initiate, perform, or control one or more of the operations described with reference to FIGS. 1-5. For example, the computer system 600 may include, or be included within, one or more of the devices, wide area wireless networks, or servers described with reference to FIGS. 1-3, such as the data source(s) 102, the computer(s) 112, or the second computer(s) 150. The computer system 600 can also be implemented as or incorporated into one or more of various other devices, such as a personal computer (PC), a tablet PC, a server computer, a personal digital assistant (PDA), a laptop computer, a desktop computer, a communications device, a wireless telephone, or any other machine capable of executing a set of instructions (sequential or otherwise) that specify actions to be taken by that machine. Further, while a single computer system 600 is illustrated, the term "system" includes any collection of systems or sub-systems that individually or jointly execute a set, or multiple sets, of instructions to perform one or more computer functions.

While FIG. 6 illustrates one example of the particular computer system 600, other computer systems or computing architectures and configurations may be used for carrying out the automated model building operations disclosed herein. The computer system 600 includes one or more processors 602. Each processor of the one or more processors 602 can include a single processing core or multiple processing cores that operate sequentially, in parallel, or sequentially at times and in parallel at other times. Each processor of the one or more processors 602 includes circuitry defining a plurality of logic circuits 604, working memory 606 (e.g., registers and cache memory), communication circuits, etc., which together enable the processor to control the operations performed by the computer system 600 and enable the processor to generate a useful result based on analysis of particular data and execution of specific instructions.

The processor(s) 602 are configured to interact with other components or subsystems of the computer system 600 via a bus 660. The bus 660 is illustrative of any interconnection scheme serving to link the subsystems of the computer system 600, external subsystems or device, or any combination thereof. The bus 660 includes a plurality of conductors to facilitate communication of electrical and/or electromagnetic signals between the components or subsystems of the computer system 600. Additionally, the bus 660 includes one or more bus controller or other circuits (e.g., transmitters and receivers) that manage signaling via the plurality of conductors and that cause signals sent the plurality of conductors to conform to particular communication protocols.

The computer system 600 also includes one or more memory devices 610. The memory devices 610 include any suitable computer-readable storage device depending on, for example, whether data access needs to be bi-directional or unidirectional, speed of data access required, memory capacity required, other factors related to data access, or any combination thereof. Generally, the memory devices 610 includes some combinations of volatile memory devices and non-volatile memory devices, though in some implementations, only one or the other may be present. Examples of volatile memory devices and circuits include registers, caches, latches, many types of random-access memory (RAM), such as dynamic random-access memory (DRAM), etc. Examples of non-volatile memory devices and circuits include hard disks, optical disks, flash memory, and certain type of RAM, such as resistive random-access memory (ReRAM). Other examples of both volatile and non-volatile memory devices can be used as well, or in the alternative, so long as such memory devices store information in a physical, tangible medium. Thus, the memory devices 610 include circuit and structures and are not merely signals or other transitory phenomena.

The memory device(s) 610 store instructions 612 that are executable by the processor(s) 602 to perform various operations and functions. The instructions 612 include instructions to enable the various components and subsystems of the computer system 600 to operate, interact with one another, and interact with a user, such as an input/output system (BIOS) 614 and an operating system (OS) 616. Additionally, the instructions 612 include one or more applications 618, scripts, or other program code to enable the processor(s) 602 to perform the operations described herein. For example, the instructions 612 can include the data agnostic model builder 122, which is configured to automatically generate the neural network 136 based on the data set 110 using the relative fitness estimator 134 to estimate relative fitness of various neural networks of a population of neural networks, as explained with reference to FIGS. 1-5.

In FIG. 6, the computer system 600 also includes one or more output devices 630, one or more input devices 620, and one or more network interface devices 640. Each of the output device(s) 630, the input device(s) 620, and the network interface device(s) 640 can be coupled to the bus 660 via an a port or connector, such as a Universal Serial Bus port, a digital visual interface (DVI) port, a serial ATA (SATA) port, a small computer system interface (SCSI) port, a high-definition media interface (HMDI) port, or another serial or parallel port. In some implementations, one or more of the output device(s) 630, the input device(s) 620, the network interface device(s) 640 is coupled to or integrated within a housing with the processor(s) 602 and the memory devices 610, in which case the connections to the bus 660 can be internal, such as via an expansion slot or other card-to-card connector. In other implementations, the processor(s) 602 and the memory devices 610 are integrated within a housing that includes one or more external ports, and one or more of the output device(s) 630, the input device(s) 620, the network interface device(s) 640 is coupled to the bus 660 via the external port(s).

Examples of the output device(s) 630 include a display device 140, one or more speakers, a printer, a television, a projector, or another device to provide an output of data in a manner that is perceptible by a user. Examples of the input device(s) 620 include buttons, switches, knobs, a keyboard 622, a pointing device 624, a biometric device, a microphone, a motion sensor, or another device to detect user input actions. The pointing device 624 includes, for example, one or more of a mouse, a stylus, a track ball, a pen, a touch pad, a touch screen, a tablet, another device that is useful for interacting with a graphical user interface, or any combination thereof.

The network interface device(s) 640 is configured to enable the computer system 600 to communicate with one or more other computer system 644 via one or more networks 642. The network interface device(s) 640 encode data in electrical and/or electromagnetic signals that are transmitted to the other computer system(s) 644 using pre-defined communication protocols. The electrical and/or electromagnetic signals can be transmitted wirelessly (e.g., via propagation through free space), via one or more wires, cables, optical fibers, or via a combination of wired and wireless transmission.

In FIG. 6, the other computer system(s) 644 include the data source(s) 102 from which the data set 110 is received. The other computer system(s) 644 can also include the other data sources 152.

In an alternative embodiment, dedicated hardware implementations, such as application specific integrated circuits, programmable logic arrays and other hardware devices, can be constructed to implement one or more of the operations described herein. Accordingly, the present disclosure encompasses software, firmware, and hardware implementations.

It is to be understood that the division and ordering of steps described herein is for illustrative purposes only and is not be considered limiting. In alternative implementations, certain steps may be combined and other steps may be subdivided into multiple steps. Moreover, the ordering of steps may change.

The systems and methods illustrated herein may be described in terms of functional block components, screen shots, optional selections and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C #, Java, JavaScript, VBScript, Macromedia Cold Fusion, COBOL, Microsoft Active Server Pages, assembly, PERL, PHP, AWK, Python, Visual Basic, SQL Stored Procedures, PL/SQL, any UNIX shell script, and extensible markup language (XML) with the various algorithms being implemented with any combination of data structures, objects, processes, routines or other programming elements. Further, it should be noted that the system may employ any number of techniques for data transmission, signaling, data processing, network control, and the like.

The systems and methods of the present disclosure may be embodied as a customization of an existing system, an add-on product, a processing apparatus executing upgraded software, a standalone system, a distributed system, a method, a data processing system, a device for data processing, and/or a computer program product. Accordingly, any portion of the system or a module may take the form of a processing apparatus executing code, an internet based (e.g., cloud computing) embodiment, an entirely hardware embodiment, or an embodiment combining aspects of the internet, software and hardware. Furthermore, the system may take the form of a computer program product on a computer-readable storage medium or device having computer-readable program code (e.g., instructions) embodied or stored in the storage medium or device. Any suitable computer-readable storage medium or device may be utilized, including hard disks, CD-ROM, optical storage devices, magnetic storage devices, and/or other storage media. As used herein, a "computer-readable storage medium" or "computer-readable storage device" is not a signal.

Computer program instructions may be loaded onto a computer or other programmable data processing apparatus to produce a machine, such that the instructions that execute on the computer or other programmable data processing apparatus create means for implementing the functions specified in the flowchart block or blocks. These computer program instructions may also be stored in a computer-readable memory or device that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions.

Although the disclosure may include a method, it is contemplated that it may be embodied as computer program instructions on a tangible computer-readable medium, such as a magnetic or optical memory or a magnetic or optical disk/disc. All structural, chemical, and functional equivalents to the elements of the above-described exemplary embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims.

Changes and modifications may be made to the disclosed embodiments without departing from the scope of the present disclosure. These and other changes or modifications are intended to be included within the scope of the present disclosure, as expressed in the following claims.

What is claimed is:

1. A method of generating a neural network based on a data set, the method comprising:
   iteratively, until a termination condition is satisfied, performing operations comprising:
   generating, for each neural network of a population of neural networks, a matrix representation, wherein the matrix representation of a particular neural network includes two or more rows of values, each row corresponding to a set of layers of the particular neural network, and each value specifying a hyperparameter of the set of layers, and wherein a first matrix representation corresponding to a first neural network includes a first number of rows and a second matrix representation corresponding to a second neural network includes a second number of rows, the second number of rows different from the first number of rows;
   providing each of the matrix representations as input, in a row-by-row sequential manner, to a recurrent network that is trained, based on the data set, as a relative fitness estimator to generate estimated fitness data for each of the neural networks, the estimated fitness data indicating predicted fitness of the neural networks of the population for processing the data set; and
   generating, based on the population and based on the estimated fitness data, a subsequent population of neural networks; and
   based on a determination that the termination condition is satisfied, outputting data identifying one or more neural networks of a final population of neural networks as a candidate neural network based on the data set.

2. The method of claim 1, further comprising, before iteratively performing the operations:
   obtaining an initial population of neural networks;
   calculating, for each neural network of the initial population, a fitness value, each fitness value based on an error value generated based on output of a respective neural network of the initial population, the error value indicating a difference between one or more values of the particular data set and the output of the respective neural network;
   generating training data indicating the fitness values for the neural network of the initial population and, for each fitness value, a matrix representation of a neural network associated with the fitness value; and
   training a machine learning model using the training data to generate the relative fitness estimator.

3. The method of claim 2, wherein obtaining the initial population of neural networks comprises:
   determining one or more characteristics of the data set;
   based on the one or more characteristics, selecting one or more parameters of an automated model generation process; and
   executing the automated model generation process to generate the initial population of neural networks using a weighted randomization process, and wherein the one or more parameters weight the weighted randomization process to adjust a probability of generation of neural networks having particular features.

4. The method of claim 3, further comprising comparing the one or more characteristics to a set of rules that maps the one or more characteristics to grammars and wherein the grammars indicate corresponding parameters.

5. The method of claim 4, wherein the grammars further indicate the hyperparameters represented by the values of each row of the matrix representations.

6. The method of claim 1, wherein the operations further comprise:
   for one or more sample neural networks from the population, calculating a fitness value based on an error value, the error value based on output of the one or more sample neural, networks and the error value indicating a difference between one or more values of the data set and the output of the one or more sample neural networks;
   generating updated training data indicating the fitness values and, for each fitness value, a matrix representation of a neural network associated with the fitness value; and
   updating the relative fitness estimator using the updated training data.

7. The method of claim 1, wherein the hyperparameters include one or more of an interconnection scheme associated with the set of layers, an activation function associated with at least one node of the set of layers, or a number of nodes of the set of layers.

8. The method of claim 1, wherein the recurrent network includes a long short-term memory layer.

9. The method of claim 1, wherein the two or more rows of the matrix representation of the particular neural network correspond to hidden layers of the particular neural network.

10. The method of claim 1, wherein the subsequent population of neural networks is further based on calculated fitness values for a subset of the population of neural networks, and wherein the subset includes at least one neural network of the population of neural networks and includes fewer than all of the neural networks of the population of neural networks.

11. The method of claim 1, wherein generating the subsequent population comprises performing evolutionary operations using one or more members of the population to generate one or more members of the subsequent population, the one or more members of the population selected based on the estimated fitness data.

12. The method of claim 1, wherein generating the subsequent population comprises training one or more members of the population to generate one or more members of the subsequent population, the one or more members of the population selected based on the estimated fitness data.

13. A computing device comprising:
   a processor; and
   a memory storing instructions executable by the processor to cause the processor to iteratively, until a termination condition is satisfied, perform operations comprising:
   generating, for each neural network of a population of neural networks, a matrix representation, wherein the matrix representation of a particular neural network includes two or more rows of values, each row corresponding to a set of layers of the particular neural network, and each value specifying a hyperparameter of the set of layers, and wherein a first matrix representation corresponding to a first neural network includes a first number of rows and a second matrix representation corresponding to a second neural network includes a second number of rows, the second number of rows different from the first number of rows;

providing each of the matrix representations as input, in a row-by-row sequential manner, to a recurrent network that is trained, based on a data set, as a relative fitness estimator to generate estimated fitness data for each of the neural networks the estimated fitness data indicating predicted fitness of the neural networks of the population for processing the data set; and generating, based on the population and based on the estimated fitness data, a subsequent population of neural networks; and the instructions further executable by the processor to cause the processor to, based on a determination that the termination condition is satisfied, output data identifying one or more neural networks of a final population of neural networks as a candidate neural network.

14. The computing device of claim 13, wherein the instructions are further executable by the processor to cause the processor to, before iteratively performing the operations:

obtain an initial population of neural networks;

calculate, for each neural network of the initial population, a fitness value, each fitness value based on an error value, the error value generated based on output of a respective neural network of the initial population and the error value indicating a difference between one or more values of the particular data set and the output of the respective neural network;

generate training data indicating the fitness values for the neural network of the initial population and, for each fitness value, a matrix representation of a neural network associated with the fitness value; and train a machine learning model using the training data to generate the relative fitness estimator.

15. The computing device of claim 14, wherein obtaining the initial population of neural networks comprises:

determining one or more characteristics of the data set;

based on the one or more characteristics, selecting one or more parameters of an automated model generation process; and executing the automated model generation process to generate the initial population of neural networks using a weighted randomization process, and wherein the one or more parameters weight the weighted randomization process to adjust a probability of generation of neural networks having particular features.

16. The computing device of claim 15, wherein the instructions are further executable by the processor to cause the processor to compare the one or more characteristics to a set of rules that maps the one or more characteristics to grammars and wherein the grammars indicate corresponding parameters.

17. The computing device of claim 16, wherein the grammars further indicate the hyperparameters represented by the values of each row of the matrix representations.

18. The computing device of claim 13, wherein the operations further comprise:

for one or more sample neural networks from the population, calculating a fitness value based on an error value, the error value based on output of the one or more sample neural networks and the error value indicating a difference between one or more values of the data set and the output of the one or more sample neural networks;

generating updated training data indicating the fitness values and, for each fitness value, a matrix representation of a neural network associated with the fitness value; and updating the relative fitness estimator using the updated training data.

19. The computing device of claim 13, wherein the hyperparameters include one or more of an interconnection scheme associated with the set of layers, an activation function associated with at least one node of the set of layers, or a number of nodes of the set of layers.

20. The computing device of claim 13, wherein the recurrent network includes a long short-term memory layer.

21. The computing device of claim 13, wherein the two or more rows of the matrix representation of the particular neural network correspond to hidden layers of the particular neural network.

22. The computing device of claim 13, wherein the subsequent population of neural networks is further based on calculated fitness values for a subset of the population of neural networks, and wherein the subset includes at least one neural network of the population of neural networks and includes fewer than all of the neural networks of the population of neural networks.

23. The computing device of claim 13, wherein generating the subsequent population comprises performing evolutionary operations using one or more members of the population to generate one or more members of the subsequent population, the one or more members of the population selected based on the estimated fitness data.

24. The computing device of claim 13, wherein generating the subsequent population comprises training one or more members of the population to generate one or more members of the subsequent population, the one or more members of the population selected based on the estimated fitness data.

25. A computer-readable storage device storing instructions that, when executed by a processor, cause the processor to iteratively, until a termination condition is satisfied, perform operations comprising:

generating, for each neural network of a population of neural networks, a matrix representation, wherein the matrix representation of a particular neural network includes two or more rows of values, each row corresponding to a set of layers of the particular neural network, and each value specifying a hyperparameter of the set of layers, and wherein a first matrix representation corresponding to a first neural network includes a first number of rows and a second matrix representation corresponding to a second neural network includes a second number of rows, the second number of rows different from the first number of rows;

providing each of the matrix representations as input, in a row-by-row sequential manner, to a recurrent network that is trained, based on a data set, as a relative fitness estimator to predict fitness of the neural networks of the population for processing the data set and to generate estimated fitness data for each of the neural networks, the estimated fitness data indicating predicted fitness of the neural networks of the population for processing the data set; and generating, based on the population and based on the estimated fitness data, a subsequent population of neural networks; and the instructions further executable by the processor to cause the processor to, based on a determination that the termination condition is satisfied, output data identifying one or more neural networks of a final population of neural networks as a candidate neural network.

26. The computer-readable storage device of claim 25, wherein the instructions are further executable by the processor to cause the processor to, before iteratively performing the operations:
obtain an initial population of neural networks;
calculate, for each neural network of the initial population, a fitness value, each fitness value based on an error value, the error value generated based on output of a respective neural network of the initial population and the error value indicating a difference between one or more values of the particular data set and the output of the respective neural network;
generate training data indicating the fitness values for the neural network of the initial population and, for each fitness value, a matrix representation of a neural network associated with the fitness value; and
train a machine learning model using the training data to generate the relative fitness estimator.

27. The computer-readable storage device of claim 26, wherein obtaining the initial population of neural networks comprises:
determining one or more characteristics of the data set;
based on the one or more characteristics, selecting one or more parameters of an automated model generation process; and
executing the automated model generation process to generate the initial population of neural networks using a weighted randomization process, and wherein the one or more parameters weight the weighted randomization process to adjust a probability of generation of neural networks having particular features.

28. The computer-readable storage device of claim 27, wherein the instructions are further executable by the processor to cause the processor to compare the one or more characteristics to a set of rules that maps the one or more characteristics to grammars and wherein the grammars indicate corresponding parameters.

29. The computer-readable storage device of claim 28, wherein the grammars further indicate the hyperparameters represented by the values of each row of the matrix representations.

30. The computer-readable storage device of claim 25, wherein the operations further comprise:
for one or more sample neural networks from the population, calculating a fitness value based on an error value, the error value based on output of the one or more sample neural networks and the error value indicating a difference between one or more values of the data set and the output of the one or more sample neural networks;
generating updated training data indicating the fitness values and, for each fitness value, a matrix representation of a neural network associated with the fitness value; and
updating the relative fitness estimator using the updated training data.

* * * * *